United States Patent
Powers et al.

(10) Patent No.: US 10,200,401 B1
(45) Date of Patent: *Feb. 5, 2019

(54) EVALUATING RESULTS OF MULTIPLE VIRTUAL MACHINES THAT USE APPLICATION RANDOMIZATION MECHANISM

(71) Applicant: Architecture Technology Corporation, Minneapolis, MN (US)

(72) Inventors: Judson Powers, Ithaca, NY (US); Robert A. Joyce, Ithaca, NY (US); Daniel McArdle, Seneca Falls, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/604,957

(22) Filed: May 25, 2017

Related U.S. Application Data

(63) Continuation-in-part of application No. 15/228,698, filed on Aug. 4, 2016, now Pat. No. 10,007,498.

(Continued)

(51) Int. Cl.
*G06F 3/00* (2006.01)
*H04L 29/06* (2006.01)
(Continued)

(52) U.S. Cl.
CPC ............ *H04L 63/1441* (2013.01); *G06F 8/61* (2013.01); *G06F 9/45504* (2013.01); *G06F 9/54* (2013.01); *G06F 21/44* (2013.01); *H04L 63/1425* (2013.01)

(58) Field of Classification Search
CPC ........................................................ G06F 9/54
(Continued)

(56) References Cited

U.S. PATENT DOCUMENTS 5,644,710 A 7/1997 Johnson et al.
5,889,992 A 3/1999 Koerber
(Continued)

FOREIGN PATENT DOCUMENTS

EP 2884392 6/2015

OTHER PUBLICATIONS

Renato J. Figueiredo, A Case for Grid Computing on Virtual Machines (Year: 2003).*

(Continued)

*Primary Examiner* — Lechi Truong
(74) *Attorney, Agent, or Firm* — Shumaker & Sieffert, P.A.

(57) ABSTRACT

An example method includes providing, by a computing system, first randomized configuration information, generating, by the computing system and based on the first randomized configuration information, a first unique instance of a software component, providing second randomized configuration information, wherein the second randomized configuration information is different from the first randomized configuration information, and generating, based on the second randomized configuration information, a second unique instance of the software component that is executable on the runtime computing system. The first and second unique instances of the software component comprise different instances of the same software component that each are configured to have uniquely different operating characteristics during execution on the runtime computing system, and the first and second unique instances of the software component are each further configured, during execution on the runtime computing system, to output false information to an external computing system.

13 Claims, 8 Drawing Sheets

Related U.S. Application Data

(60) Provisional application No. 62/268,988, filed on Dec. 17, 2015.

(51) Int. Cl.
*G06F 21/44* (2013.01)
*G06F 8/61* (2018.01)
*G06F 9/455* (2018.01)
*G06F 9/54* (2006.01)

(58) Field of Classification Search
USPC .......................................................... 719/328
See application file for complete search history.

(56) References Cited

U.S. PATENT DOCUMENTS

| | | | |
|---|---|---|---|
| 7,076,801 | B2 | 7/2006 | Gong et al. |
| 7,134,123 | B1 | 11/2006 | Berry et al. |
| 7,350,234 | B2 | 3/2008 | Goseva-Popstojanova et al. |
| 7,472,249 | B2 | 12/2008 | Cholleti et al. |
| 7,607,129 | B2 | 10/2009 | Rosu et al. |
| 8,510,747 | B2 | 8/2013 | Tian et al. |
| 8,640,238 | B2 | 1/2014 | Brueckner et al. |
| 8,839,426 | B1 | 9/2014 | Brueckner et al. |
| 9,094,449 | B2 | 7/2015 | Brueckner et al. |
| 9,665,349 | B2 | 5/2017 | Savage et al. |
| 9,740,703 | B2 * | 8/2017 | Lim .................. G06F 17/30091 |
| 9,910,721 | B2 | 3/2018 | Wu et al. |
| 2003/0217126 | A1 | 11/2003 | Polcha et al. |
| 2005/0198303 | A1 | 9/2005 | Knauerhase et al. |
| 2008/0263658 | A1 | 10/2008 | Michael et al. |
| 2009/0007100 | A1 | 1/2009 | Field et al. |
| 2009/0313620 | A1 | 12/2009 | Sedukhin et al. |
| 2010/0043073 | A1 | 2/2010 | Kuwamura |
| 2010/0185596 | A1 | 7/2010 | Dee |
| 2010/0269167 | A1 | 10/2010 | Kashima |
| 2011/0142053 | A1 | 6/2011 | Van Der Merwe et al. |
| 2012/0042365 | A1 | 2/2012 | Shoval et al. |
| 2012/0110570 | A1 | 5/2012 | Jacobson et al. |
| 2012/0204193 | A1 * | 8/2012 | Nethercutt .......... G06F 11/3495 719/330 |
| 2012/0259816 | A1 | 10/2012 | Cargille et al. |
| 2013/0007693 | A1 | 1/2013 | Bliss et al. |
| 2013/0054734 | A1 * | 2/2013 | Bond .................... G06F 9/4856 709/217 |
| 2013/0055256 | A1 | 2/2013 | Banga et al. |
| 2013/0097603 | A1 | 4/2013 | Amano et al. |
| 2013/0166703 | A1 | 6/2013 | Hammer et al. |
| 2013/0227710 | A1 | 8/2013 | Barak et al. |
| 2014/0096134 | A1 | 4/2014 | Barak et al. |
| 2014/0157407 | A1 | 6/2014 | Krishnan et al. |
| 2015/0033221 | A1 | 1/2015 | Chari et al. |
| 2015/0046405 | A1 | 2/2015 | Brueckner et al. |
| 2015/0277867 | A1 * | 10/2015 | Hasabnis ................ G06F 8/433 717/164 |
| 2015/0309831 | A1 | 10/2015 | Powers et al. |
| 2015/0334130 | A1 | 11/2015 | Brueckner et al. |

OTHER PUBLICATIONS

Amendment in Response to Office Action dated Oct. 4, 2017, from U.S. Appl. No. 15/228,698, filed Dec. 21, 2017, 15 pp.
"Apache Core Features," retrieved on Jul. 14, 2016, from http://httpd.apache.org/docs/2.4/mod/core.html#servertokens, 73 pp.
"ARM architecture," Aug. 1, 2016, retrieved from https://en.wikipedia.org/wiki/ARM_architecture, 23 pp (retrieved on Aug. 3, 2016).
"DOD Needs to Better Support Program Managers' Implementation of Anti-Tamper Protection," Defense Acquisitions, GAO, United States General Accounting Office, Mar. 2004, 25 pp.
"dtrace.org," retrieved on Jul. 14, 2016, from http://dtrace.org/, 2 pp.
"Google Code Archive—Long-term storage for Google Code Project Hosting," retrieved on Jul. 14, 2016, from https://code.google.com/archive/p/volatility/wikis/LinuxMemoryForensics.wiki, 4 pp.
"Home," obfuscator, retrieved on Jul. 14, 2016, from https://github.com/obfuscator-llvm/obfuscator/wiki, Nov. 17, 2015, 1 pp.
"Honeynet Project," retrieved on Jul. 14, 2016, from https://en.wikipedia.org/wiki/Honeynet_Project, 2 pp.
"Honeypot (computing)," retrieved on Jul. 14, 2016, from https://en.wikipedia.org/wiki/Honeypot_(computing), 6 pp.
"IDA: About," retrieved on Jul. 14, 2016, from https://www.hex-rays.com/products/ida/, 1 pp.
"Install SharePoint 2013 across multiple servers for a three-tier farm," SharePoint 2013, Jul. 16, 2012, 13 pp.
"Organically Assured and Survivable Information Systems (OASIS) Technology Transition Assessment (OTTA)," AFRL-IF-RS-TR-2004-67, Final Technical Report, Mar. 2004, 56 pp.
"SAFECode," retrieved on Jul. 14, 2016, from http://safecode.cs.illinois.edu/ , 1 pp.
"SHelp: Automatic Self-healing for Multiple Application Instances in a Virtual Machine Environment", Gang Chen, Hai Jin, Dequing Zou, Bing Bing Zhou, Weizhong Qiang and Gang Hu, Huazhong University of Science and Technology, Wuhan, 430074, China, 2010 IEEE International Conference on Cluster Computing, pp. 97-106.
"Smashing the Stack in 2011," retrieved from https://paulmakowski.wordpress.com/2011/01/25/smashing-the-stack-in-2011/, Jan. 25, 2011, 9 pp.
"SWARM, a System-Wide Application Randomization Mechanism," SIBR.gov, retrieved on Jul. 14, 2016 from https://www.sibr.gov/sibrsearch/detail/824209, 4 pp.
"The Volatility Framework," Google Code Archive—Long-term storage for Google Code Project Hosting., retrieved on Jul. 14, 2016, from https://code.google.com/p/volatility/, 1 pp.
"VMware High Availability," Easily Deliver High Availability for All of Your Virtual Machines, VMware, Inc., 2009, 2 pp.
"VMware vSphereTM 4 Fault Tolerance: Architecture and Performance," White paper, VMware, Inc., 2009, 19 pp.
Abadi et al., "On Protection by Layout Randomization," ACM Trans. Inf. Syst. Secur. 15, 2, Article 8, Jul. 2012, 39 pp.
Alberts et al., "Mission Assurance Analysis Protocol (MAAP): Assessing Risk in Complex Environments," retrieved from http://www.sei.cmu.edu/reports/05tn032.pdf, Sep. 2005, 59 pp.
Bargar, "DOD Global Information Grid Mission Assurance," CrossTalk, The Journal of Defense Software Engineering, retrieved at http://www.crosstalkonline.org/storage/issue-archives/2008/200807/200807-Bargar.pdf, Jul. 2008, 3 pp.
Borman et al., "A Serially Reusable Java(tm) Virtual Machine Implementation for High Volume, Highly Reliable, Transaction Processing," Accessed Apr. 29, 2013, 21 pp.
Castro, et al., "Practical Byzantine Fault Tolerance and Proactive Recovery," ACM Transactions on Computer Systems (Association for Computing Machinery), vol. 20, No. 4, Nov. 2002, pp. 398-461.
Chabrow, "Intelligent Defense Against Intruders," Government Information Security, May 23, 2012, retrieved from http://www.govinfosecurity.com/interviews/intelligent-defense-against-intruders-i-1565, 1 pp.
Chew et al., "Mitigating Buffer Overflows by Operating System Randomization," Carnegie Mellon University Technical Report CMU-CS-02-197, Dec. 2002, 11 pp.
Cox, et. al, "N-Variant Systems: A Secretless Framework for Security through Diversity," USENIX Security Symposium, Vancouver, BC, Aug. 3, 2006, 16 pp.
Custy et al., "Conditional Entropy for Deception Analysis," 13th ICCRTS: C2 for Complex Endeavors, Jun. 2008, 22 pp.
Department of Defense Instruction, "Information Assurance (IA) Implementation," retrieved from http://WWW.dtic.mil/whs/directives/corres/pdf/850002.pdf, Feb. 6, 2003, 102 pp.
Duren, "Organically Assured and Survivable Information Systems (OASIS) Technology Transition Assessment (OTTA)," Defense Advanced Research Projects Agency, DARPA Order No. K128, N684m P004, Mar. 2004, 56 pp.
Hachman, "Facebook's Web Server Strategy: 'Chinese Foot Soldiers'," PCMag.com, Mar. 15, 2011, 4pp.

(56) References Cited

OTHER PUBLICATIONS

Huffmire, et al., "Policy-Driven Memory Protection for Reconfigurable Hardware," ESORICS 2006, LNCS 4189, Sep. 2006, pp. 461-478.
Jiang, et al., "RandSys: Thwarting Code Injection Attacks with System Service Interface Randomization," in Proceedings of the 26th IEEE International Symposium on Reliable Distributed Systems, Oct. 2007, pp. 209-218.
Leech et al., "Socks Protocol Version 5," Network Working Group, RFC 1928, Mar. 1996, 9 pp.
Maftia, "Malicious-and Accidental-Fault Tolerance for Internet Applications," 1st Research Project IST-1999-11583, retrieved at http://spiderman-2.laas.fr/TSF/cabernetlmaftia/index.html, Jan. 1, 2000-Feb. 28, 2003, 2 pp.
Matthews et al.. "Data Protection and Rapid Recovery From Attack With a Virtual Private File Server and Virtual Machine Appliances," Clarkson University, 2005, (Applicant points out, in accordance with MPEP 609.04(a), that the year of publication, 2005, is sufficiently earlier than the effective U.S. filing date, 2017, so that the particular month of publication is not in issue.) 12 pp.
Nguyen, et al., "A framework for diversifying windows native APIs to tolerate code injection attacks," In Proceedings ACM Symposium on Information, Computer and Communications Security (ASIACCS), Mar. 2007, pp. 392-394.
Reiser et al., "VM-FIT: Supporting Intrusion Tolerance with Virtualisation Technology," Proceedings of the 1st Workshop on Recent Advances in Intrusion-Tolerant Systems, 2007, (Applicant points out, in accordance with MPEP 609.04(a), that the year of publication, 2007, is sufficiently earlier than the effective U.S. filing date, 2017, so that the particular month of publication is not in issue.) pp. 18-22.
Reynolds et al., "The Design and Implementation of an Intrusion Tolerant System," IEEE Proceedings of the International Conference on Dependable Systems and Networks (DSN'02), Jun. 2002, 6 pp.
Rowe et al., "Thwarting Cyber-Attack Reconnaissance with Inconsistency and Deception," Proc. 8th IEEE Workshop on Information Assurance, Jun. 2007, 10 pp.
Rowe, "Designing Good Deceptions in Defense of Information Systems," Proc. 2004; retrieved from faculty.nps.edu/ncrowe/acsac04_paper36.htm, ACSAC., Dec. 2004; 16 pp.
Rowe, "Finding Logically Consistent Resource-Deception Plans for Defense in Cyberspace," retrieved from faculty.nps.edu/ncrowe/ssnds07.htm, May 2007; 9 pp.
Rutkowska, "Disposable VMs," The Invisible Things Lab's blog, Kernel, Hypervisor, Virtualization, Trusted Computing and other system-level security stuff, Jun. 1, 2010, 7pp.
Shacham, et al., "On the Effectiveness of Address-Space Randomization," in Proceedings of the ACM Conference on Computer and Communications Security (CCS '04), Oct. 2004, 10 pp.
Shi et al., "An Intrusion-Tolerant and Self-Recoverable Network Service System Using a Security Enhanced Chip Multiprocessor," IEEE Proceedings of the Second International Conference on Autonomic Computing (ICAC'05), Jun. 2005, 11pp.
Verissimo, "MAFTIA—Malicious and Accidental Fault Tolerance for Internet Applications," TF-CSIRT Workshop, Sep. 2005, 14 pp.
Wang et al., "SafeFox: a Safe Lightweight Virtual Browsing Environment," Proceedings of the 43rd Hawaii International Conference on System Sciences-, Jan. 2010, 10 pp.
Wartell, et al., "Binary stirring: self-randomizing instruction addresses of legacy x86 binary code," In Proceedings of the Oct. 16-18, 2012 ACM conference on Computer and communications security (CCS '12). ACM, New York, NY, USA, 157-168, 12 pp.
Zambreno, et al., "High-Performance Software Protection using Reconfigurable Architectures," Proceedings of the IEEE, vol. 94, Issue 2, Feb. 2006, 13 pp.
Department of Defense, Task Force Report: Resilient Military Systems and the Advanced Cyber Threat, Jan. 2013, 146 pgs.
Bodeau et al., MITRE Technical Report, "Cyber Resiliency Engineering Framework", Dec. 2011, 78 pgs.
Cyber Kill Chain—Lockheed Martin, "Proactively Detect Persistent Threats", Retrieved Mar. 14, 2017 from http://www.lockheadmartin.com/us/what-we-do/aerospace-defence/cyber/cyber-kill-chain.html, 3 pgs.
Wikipedia—TCP/IP stack fingerprinting, Retrieved on Apr. 7, 2017 from https://en.wikipedia.org/wiki/TCP/IP_stack_fingerprinting, 3 pgs.
Multari et al., "Building the Theory of Resilience", Pacific Northwest National Laboratory, 2013, 39 pgs. Applicant points out, in accordance with MPEP 609.04(a), that the year of publication, <2013, is sufficiently earlier than the effective U.S. filing date, 2017, so that the particular month of publication is not in issue.
Tinc VPN, Welcome to tinc!, Feb. 4, 217, Retrieved from https://www.tinc-vpn.org/, 2 pgs.
U.S. Appl. No. 15/228,698, filed Aug. 4, 2016 by Judson Powers et al.
U.S. Appl. No. 15/604,850, filed May 25, 2017 by Daniel McArdle et al.
U.S. Appl. No. 15/604,868, filed May 25, 2017 by Judson Powers et al.
U.S. Appl. No. 15/604,875, filed May 25, 2017 by Judson Powers et al.
U.S. Appl. No. 15/604,973, filed May 25, 2017 by Judson Powers et al.
U.S. Appl. No. 15/605,168, filed May 25, 2017 by Judson Powers et al.
Office Action from U.S. Appl. No. 15/228,698, dated Oct. 4, 2017, 21 pp.
Notice of Allowance from U.S. Appl. No. 15/228,698, dated Feb. 27, 2018, 22 pp.
Nanda et al., "A Survey on Virtualization Technologies," Stony Brook University, Jan. 2005, 42 pp.
Office Action from U.S. Appl. No. 15/604,868, dated Jun. 14, 2018, 15 pp.
Office Action from U.S. Appl. No. 15/604,875, dated Jun. 14, 2018, 14 pp.
Office Action from U.S. Appl. No. 15/605,168, dated Jul. 12, 2018, 5 pp.
Office Action from U.S. Appl. No. 16/015,529, dated Aug. 24, 2018, 22 pp.
Amendment in Response to Office Action dated Jun. 14, 2018, from U.S. Appl. No. 15/604,868, filed Sep. 14, 2018, 16 pp.
Amendment in Response to Office Action dated Jun. 14, 2018, from U.S. Appl. No. 15/604,875, filed Sep. 14, 2018, 10 pp.
Amendment in Response to Office Action dated Jul. 12, 2018, from U.S. Appl. No. 15/605,168, filed Oct. 8, 2018, 17 pp.
Notice of Allowance from U.S. Appl. No. 15/605,168, dated Nov. 5, 2018, 9 pp.

* cited by examiner

EVALUATING RESULTS OF MULTIPLE VIRTUAL MACHINES THAT USE APPLICATION RANDOMIZATION MECHANISM

This application is a continuation-in-part of U.S. patent application Ser. No. 15/228,698, filed Aug. 4, 2016, now issued as U.S. Pat. No. 10,007,498, which claims the benefit of U.S. Provisional Patent Application 62/268,988, filed Dec. 17, 2015, the entire content of each of which is incorporated herein by reference.

BACKGROUND

In a computing system, reconnaissance is often a typical first step in a targeted attack. An attacker must often learn of available services, software, and operating system configuration in order to determine how to best infiltrate a given system. This information can often be gathered directly or indirectly via specifically crafted network requests.

Current standard practices are to limit the information available to attackers via network services. For instance, a web server can be configured to refrain from revealing its name, version number, or installed modules. However, not all server applications can be configured in this way, and not all protocols allow for such minimal server information. In addition, attackers can often use other indirect information to determine server operating characteristics.

SUMMARY

In one example, a method includes providing, by a computing system comprising one or more processors, first randomized configuration information, and generating, by the computing system and based on the first randomized configuration information, a first unique instance of a software component that is executable on a runtime computing system. The example method further includes providing, by the computing system, second randomized configuration information, wherein the second randomized configuration information is different from the first randomized configuration information, and generating, by the computing system and based on the second randomized configuration information, a second unique instance of the software component that is executable on the runtime computing system. The first and second unique instances of the software component are different instances of the same software component that each are configured to have uniquely different operating characteristics during execution on the runtime computing system. The first and second unique instances of the software component are each further configured, during execution on the runtime computing system, to output false information to an external computing system.

In one example, a computing system includes one or more processors, and a computer-readable storage device communicatively coupled to the one or more processors. The computer-readable storage device stores instructions that, when executed by the one or more processors, cause the one or more processors to provide first randomized configuration information, generate, based on the first randomized configuration information, a first unique instance of a software component that is executable on a runtime computing system, provide second randomized configuration information, wherein the second randomized configuration information is different from the first randomized configuration information, and generate, based on the second randomized configuration information, a second unique instance of the software component that is executable on the runtime computing system. The first and second unique instances of the software component are different instances of the same software component that each are configured to have uniquely different operating characteristics during execution on the runtime computing system. The first and second unique instances of the software component are each further configured, during execution on the runtime computing system, to output false information to an external computing system.

In one example, a computer-readable storage device stores instructions that, when executed, cause a computing system having one or more processors to perform operations. The operations include providing first randomized configuration information, and generating, based on the first randomized configuration information, a first unique instance of a software component that is executable on a runtime computing system. The operations further include providing second randomized configuration information, wherein the second randomized configuration information is different from the first randomized configuration information, and generating, based on the second randomized configuration information, a second unique instance of the software component that is executable on the runtime computing system. The first and second unique instances of the software component are different instances of the same software component that each are configured to have uniquely different operating characteristics during execution on the runtime computing system. The first and second unique instances of the software component are each further configured, during execution on the runtime computing system, to output false information to an external computing system.

In one example, this disclosure describes a method comprising: initializing, by a computing system, a plurality of virtual machines (VMs), wherein initializing the plurality of VMs comprises: for at least one particular VM of the plurality of VMs: generating, by the computing system, a randomized instance of an operating system for the particular VM, wherein the randomized instance of the operating system for the particular VM has a randomized Application Binary Interface (ABI); generating, by the computing system, a randomized instance of a software program for the particular VM, the randomized instance of the software program configured to use the randomized ABI of the randomized instance of the operating system for the particular VM; and installing, by the computing system, the randomized instance of the operating system for the particular VM and the randomized instance of the software program for the particular VM on the particular VM; and deploying, by the computing system, the plurality of VMs; receiving, by the computing system, a series of incoming messages from a client device; distributing, by the computing system, a copy of each incoming message in the series of incoming messages to each VM of the plurality of VMs; receiving, by the computing system, results generated by the plurality of VMs in response to the series of incoming messages; performing, by the computing system, a comparison on the results; and in response to the comparison revealing that two or more of the results are not the same, performing, by the computing system, a cybersecurity defense action.

In one example, this disclosure describes a computing system comprising: a development computing system comprising a first set of one or more processors; a runtime computing system comprising a second set of one or more processors; a distributor comprising a third set of one or more processors; and a result evaluator comprising a fourth set of one or more processors, wherein the development computing system is configured to: initialize a plurality of virtual machines (VMs), wherein the development computing system is configured such that, as part of initializing the plurality of VMs, the development computing system: for at least one particular VM of the plurality of VMs: generates a randomized instance of an operating system for the particular VM, wherein the randomized instance of the operating system for the particular VM has a randomized ABI; generates a randomized instance of a software program for the particular VM, the randomized instance of the software program configured to use the randomized ABI of the randomized instance of the operating system for the particular VM; and installs the randomized instance of the operating system for the particular VM and the randomized instance of the software program for the particular VM on the particular VM; and deploy the plurality of VMs on the runtime computing system, wherein the distributor is configured to: receive a series of incoming messages from a client device; and distribute a copy of each incoming message in the series of incoming messages to each VM of the plurality of VMs, and wherein the result evaluator is configured to: receive results generated by the plurality of VMs in response to the series of incoming messages; perform a comparison on the results; and in response to the comparison revealing that two or more of the results are not the same, perform a cybersecurity defense action.

In one example, this disclosure describes a non-transitory computer-readable data storage medium having instructions stored thereon that, when executed, cause a computing system comprising one or more processors to: initialize a plurality of virtual machines (VMs), wherein as part of causing the computing system to initialize the plurality of VMs, the instructions cause the computing system to: for at least one particular VM of the plurality of VMs: generate a randomized instance of an operating system for the particular VM, wherein the randomized instance of the operating system for the particular VM has a randomized ABI; generate a randomized instance of a software program for the particular VM, the randomized instance of the software program configured to use the randomized ABI of the randomized instance of the operating system for the particular VM; and install the randomized instance of the operating system for the particular VM and the randomized instance of the software program for the particular VM on the particular VM; and deploy the plurality of VMs; receive a series of incoming messages from a client device; distribute a copy of each incoming message in the series of incoming messages to each VM of the plurality of VMs; receive results generated by the plurality of VMs in response to the series of incoming messages; perform a comparison on the results; and in response to the comparison revealing that two or more of the results are not the same, perform a cybersecurity defense action.

The details of one or more examples are set forth in the accompanying drawings and the description below. Other features, objects, and advantages of the disclosure will be apparent from the description and drawings, and from the claims.

DETAILED DESCRIPTION

In current systems, attackers may be capable of observing crucial components and configurations of static target operational environments and information that is available via certain technologies (e.g., public fingerprinting technologies). Much of this information may be communicated through standard Internet browsing technologies available to users, and, for an attacker, the use of such information can lead to successful exploitation. Techniques of the present disclosure may falsify externally reported settings and provide a method to randomize the applications that are utilized. By exposing attackers to a dynamic environment, the ability of these attackers to perform reconnaissance on a target system may be greatly reduced.

The techniques of the present disclosure may provide, in various examples, a system-wide application randomization mechanism (SWARM), which allows computing systems to provide false and non-reusable system information to potential attackers. The techniques may combine ephemeral virtual machine technology with system-wide Application Binary Interface (ABI) changes, source code and configuration changes, and application-level randomization, giving each system instance a unique set of operating characteristics. By evolving the characteristics of computing systems over time, these techniques may help ensure that any information an adversary or attacker does obtain is incorrect by the time it is used, while minimizing any potential operational or performance impact. These computing systems may present attackers with different, mutually incompatible system instances each time they connect. As one non-limiting example, an adversary that is able to fingerprint a system, such as by using network stack probes, may gain no information that aids in subverting it. In fact, later intrusion attempts using this information can be used to track and correlate adversaries.

These techniques can benefit various different types of computing systems, including network servers and desktop workstations. The techniques may provide both false and actual randomness to running operating systems and applications on a number of levels. These techniques may go beyond currently deployed diversity techniques such as Address Space Layout Randomization (ASLR) by introducing aspects of interface diversity and implementation diversity, both within an application and at the system level, and may modifying the software build system to create unique, yet internally consistent copies of application software and associated libraries. In addition, in some cases, unauthorized code may immediately fault and be killed by the operating system with potentially high probability.

Figure 1:
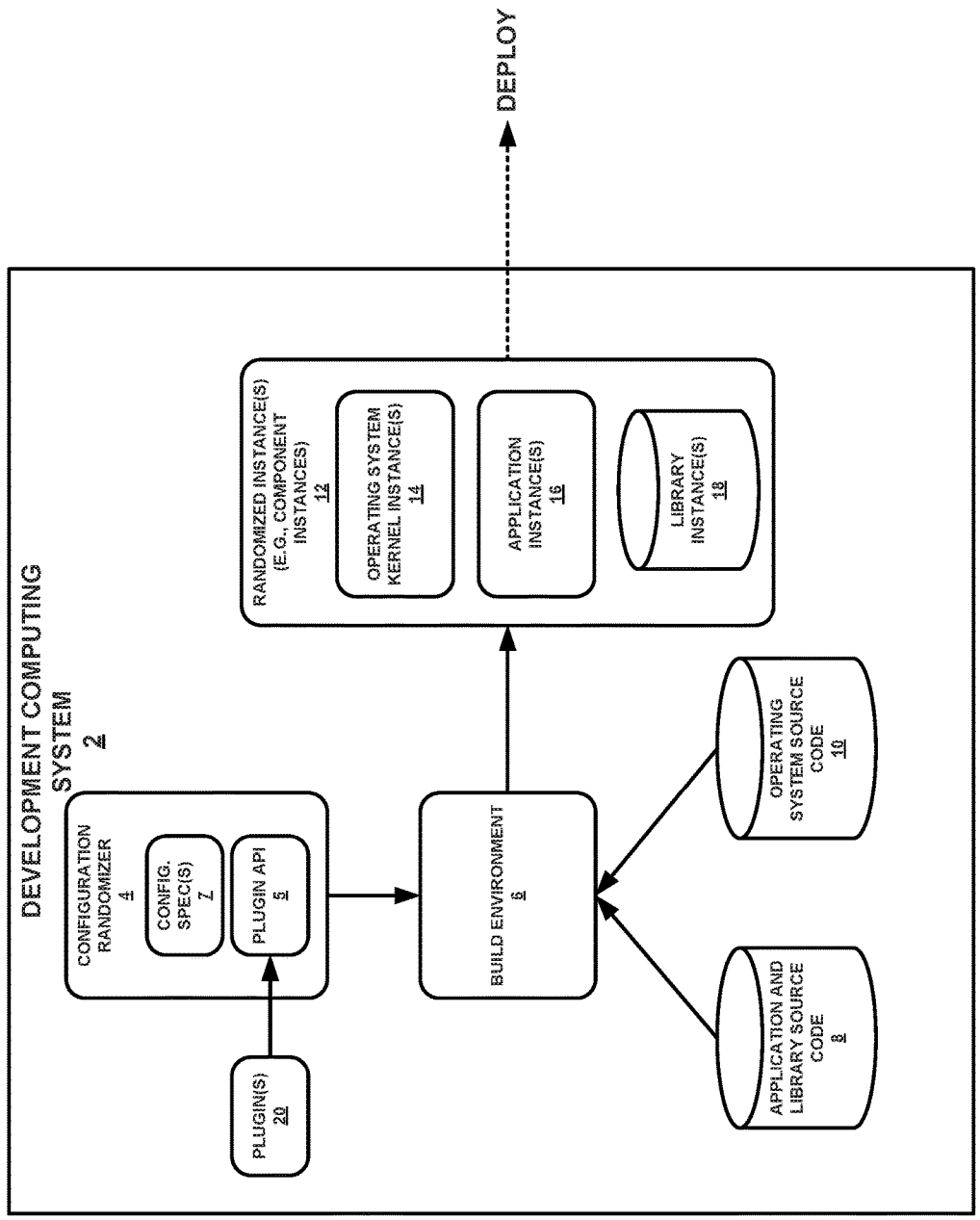
FIG. 1 is a block diagram illustrating an example development computing system that is configured to deploy randomized operating system kernel, application, and/or library instances, in accordance with one or more aspects of the present disclosure.

FIG. 1 is a block diagram illustrating an example development computing system 2 that is configured to deploy randomized operating system kernel, application, and/or library instances, in accordance with one or more aspects of the present disclosure. As shown in FIG. 1, development computing system 2 includes a configuration randomizer 4, a build environment 6, application and library source code 8, and operating system source code 10. Configuration randomizer 4 includes a plugin application programming interface (API) 5 for use with one or more plugins 20. As will be described in further detail below, build environment 6 of development computing system 2 may utilize configuration randomizer 4, application and library source code 8, and operating system source code 10 to generate one or more randomized instances 12, which may be deployed on one or more runtime computing systems, such as the runtime systems illustrated in FIGS. 3 and 4. Randomized instances 12 may comprise one or more instances of software components, such as, for example, one or more instances of applications and/or operating systems/kernels. For example, randomized instances 12 may include one or more operating system kernel instances 14, one or more application instances 16, and one or more library instances 18.

Each instance of randomized instances 12 may comprise a unique instance of a particular software component. For instance, one or more of instances 14 may each comprise a unique instance of a particular operating system kernel, where these one or more of instances 14 are different instances of the same software component (e.g., different instances of a given operating system kernel) and are configured to have uniquely different operating characteristics during execution on a runtime computing system (e.g., runtime computing system 80 shown in FIG. 3). Similarly, one or more of instances 16 may each comprise a unique instance of a particular application, and one or more of instances 18 may each comprise a unique instance of a particular library.

In order to thwart reconnaissance, the techniques of the present disclosure provide randomized instances 12 containing actual operational differences that prevent an adversary's knowledge from being useful. Users of development computing system 2, such as system deployment personnel, may utilize configuration randomizer 4, which generates one or more unique keys 7 that are used by build environment 6 to generate randomized instances 12. Each of keys 7 may comprise random sequences or unique binary data to characterize one or more system properties. As such, each key of keys 7 may comprise randomized configuration information. When source code is available, such as application and library source code 8 and operating system source code 10, these keys 7 and/or other unique data are used by build environment 6 to customize this source code, including altering configurations and the kernel and application binary interfaces (ABI's), as described in more detail below.

Figure 2:
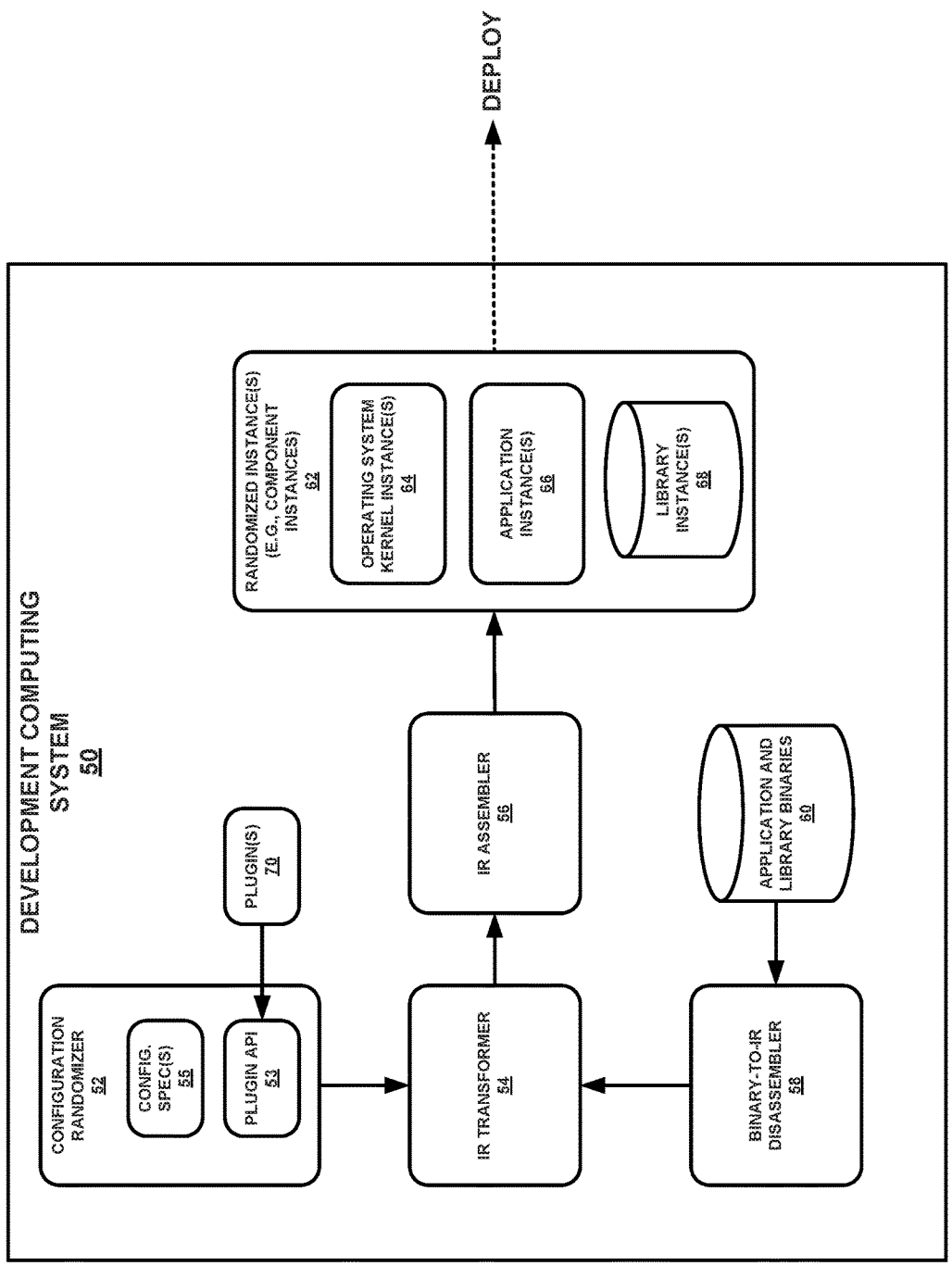
FIG. 2 is a block diagram illustrating another example development computing system that is configured to deploy randomized operating system kernel, application, and/or library instances, in accordance with one or more aspects of the present disclosure.

The results may then be fed to one or more compilers of build environment 6 (e.g., customized versions of standard compilers, such as a GNU Compiler Collection (GCC) and/or Low Level Virtual Machine (LLVM) compiler). The compilers and/or linkers of build environment 6, along with associated build scripts, may be used to generate randomized instances 12, which include operating system kernel instances 14, application instances 16, and library instances 18. If source code is not available, the techniques of the present disclosure can utilize tools to generate LLVM Intermediate Representation (IR) from binary executables and libraries, and then transform the IR directly and re-assemble it back to executable form, such as shown in the example of FIG. 2. In either case, application operation may be undisturbed, and, to an end user, a modified application, such as one of application instances 16, behaves exactly as an unmodified one would. The overall impact on performance may be minimal in many cases, because the scrambling techniques described herein may not require additional computation at runtime.

The custom operating system, application build, and configuration provided by randomized instances 12 are internally consistent within development computing system 2, but may not be binary compatible with standard builds that may be generated by build environment 6 without the use of configuration randomizer 4. Users of development computing system 2, such as system deployment personnel, can make as many unique, and mutually binary-incompatible, system builds for randomized instances 12 as desired and/or required. Each instance of randomized instances 12 may comprise a unique instance that is generated based upon one of keys 7, where each of keys 7 may comprise a unique identifier. Further, if a user of development computing system 2 wishes to re-build application instances within application instances 16 (e.g., for an already-built system), SWARM can re-use the key and configuration data used by configuration randomizer 4 and build environment 6. If, however, the deployed instances will not be modified, configuration randomizer 4 and build environment 6 can randomly generate and use a unique, single-use key of keys 7.

As will be described in further detail below, configuration randomizer 4 may utilize certain configuration data or settings, such as provided by one or more plugins 20, which is provided to build environment 6 along with one or more of keys 7. The key and configuration data is stored only on development computing system 2, and in various examples, is not deployed to or stored on any of the runtime computing systems, such as the runtime systems shown in FIGS. 3 and 4. Plugins 20 may, in general, provide configuration settings that are used by configuration randomizer 4 via plugin API 5. In various cases, configuration randomizer 4 may provide one or more of keys 7 based upon the configuration settings provided by plugins 20 via plugin API 5. In some cases, false information that is output by one or more of instances 12 during runtime may be based on these configuration settings.

Configuration randomizer 4 and/or build environment 6 may utilize various different techniques that result in the generation of randomized instances 12. For example, randomized instances 12 generated by build environment 6 and deployed on a runtime computing system may alter server or application configurations. Instances 12 can change configuration settings in internally consistent ways, such as, for example, altering the Unix-domain socket path used by a PHP Hypertext Preprocessor web application to communicate with a local database at runtime. In other non-limiting examples, instances 12 can enable or disable unused features that are not needed, alter "greeting" messages that servers issue, or change TCP/IP parameters slightly.

As will be described in further detail below, in various examples, development computing system 2 provides first randomized configuration information (e.g., a first key of keys 7), and generates, based on the first randomized configuration information, a first unique instance of a software component (e.g., a first one of operating system kernel instances 14, a first one of application instances 16) that is executable on a runtime computing system, such as one of the runtime systems illustrated in FIGS. 3 and 4. Development computing system 2 may also provide second randomized configuration information (e.g., a second key of keys 7), the second randomized configuration information being different from the first randomized configuration information, and may generate, based on the second randomized configuration information, a second unique instance of the software component (e.g., a second one of operating system kernel instances 14, a second one of application instances 16) that is executable on the runtime computing system. The first and second unique instances of the software component are different instances of the same software component that each are configured to have uniquely different operating characteristics during execution on the runtime computing system. The first and second unique instances of the software component are each further configured, during execution on the runtime computing system, to output false information to an external computing system, as will be described in further detail below.

The use of the techniques described herein may provide a high degree of uniqueness among deployed instances 12, while at the same time thwarting dynamic analysis, static analysis, and other forms of reverse engineering. Source code compatibility may also be maintained, given that modifications to application and library source code 8, as well as operating system source code 10, may not be required. Instead, configuration randomizer 4 and build environment 6 may utilize existing application and library source code 8 and operating system source code 10 to generate randomized instances 12. Where source code is not available, many of these techniques can be implemented using binary transformations on LLVM IR, such as shown in FIG. 2. The techniques may make crashing a natural consequence of an attacker's initial operations (e.g., buffer overflows, library calls, system calls) upon attempted execution of instances 12, preventing an attack from having any real effect before crashing.

In various examples, configuration randomizer 4 and build environment 6 may implement keyed modification of kernel data structures when generating operating system kernel instances 14. Kernel data structures determine how an operating system arranges and uses memory internally. Memory analysis, in particular, depends on being able to recognize and decipher kernel data structures. Generally, memory analysis tools are not able to interpret the internal data structures of application software, yet these tools are widely used for reverse engineering (particularly malware), because so many of the resources and actions of an application go through the kernel. Similarly, malware (e.g., particularly stealth malware such as rootkits) modify kernel data in order to hide their presence or exploit the system. Both the techniques of memory analysis and rootkits require knowing the in-memory layout of internal kernel data. Kernel data structures are internal to the system and are not normally intended to be used by application software. They are allowed to, and often do, change without notice (e.g., when upgrading an operating system). As a result, kernel data structures may, in many cases, be modified without affecting and/or breaking applications during execution.

In various examples, build environment 6 may perturb the data structures in kernel source code based on a key, such as when generating operating system kernel instances 14. Modifications can include field ordering, padding length, and the values of key constants, such as the executable and linkable format (ELF) header markers commonly used to find executables mapped in memory. Build environment 6 may do so by modifying operating system source code 10 based on keys 7 from configuration randomizer 4 to generate modified kernel data structures in operating system kernel instances 14, which helps ensure that the kernel's use of the data structure is internally consistent.

Two low-level transformations may be implemented by build environment 6 and configuration randomizer 4 to generate instances 12: system call scrambling and application binary interface (ABI) randomization. System calls are the low-level mechanism for calling functions in the OS kernel. Any manipulation of the system by an application, such as writing a file or starting a process, often directly or indirectly uses system calls. Remote exploits (e.g., shellcode) often access system calls directly, rather than through a library. Application software, on the other hand, typically accesses system calls through a library, such as the C library. System calls may be implemented using a system call table that maps system call numbers to kernel functions. System call conventions are similar to traditional function call conventions but have an additional parameter that can be manipulated, beyond calling-convention choices: the system call numbers. The use of the system call numbers provides a large space for creating system variants. On Linux, for example, there are less than 200 valid system call numbers out of a 16-bit space. Conservative permutations of register choices create about $2^{15}$ variants. On top of this, permuting the system call numbers may create more than $2^{1800}$ variants, in certain examples.

Through deployment of instances 12 on runtime computing systems, a unique system call table may be generated on each runtime system, yielding, e.g., many bits of uniqueness (key space) and increasing the work of reverse engineering low-level libraries. Changing the system call table and other kernel binary interfaces may prevent many attack tools from executing on a runtime system at all, and it also breaks reverse engineering tools that rely on the system call table to deduce what a program will do during execution.

In various examples, system call scrambling may be based on a key (e.g., one of keys 7), and kernel headers and the system call table may be altered to enable automated modification of the system call architecture. A tool (e.g., a script) of build environment 6 may automatically modify the system call numbers in application and library source code 8 and/or operating system source code 10 based on the key (e.g., a randomly chosen binary number). After modifying this code, build environment automatically compiles instances 12.

Further, build environment 6 may leave all of the original system call numbers unused, which guarantees that any system call from unmodified code will immediately fail, since no standard system call number is valid. The large space of possible system call numbers and small number of valid system calls makes it difficult for an attacker to find a valid system call merely by chance. This modification approach may have minimal runtime cost, with little to no runtime cost for conservative scrambling choices.

Additionally, in certain examples, instances 12 may change the library, function ABI, and/or register behavior.

Deployment of instances 12 may change the way in how common registers are used, such as the frame pointer that keeps track of the current stack frame's location. Each function call may have different, random offsets for values in certain locations. Application and library source code 8 and operating system source code 10 compiled using build environment 6 of FIG. 1 will automatically reference the correct data, but reverse engineering tools may fail.

Configuration randomizer 4 and build environment 6 may also be used to transform software ABI's by modifying function calling conventions used by one or more of instances 12. An ABI defines how binary software communicates with other software components, particularly libraries, and is determined at compile time. As one example, to an attacker inserting shellcode directly, such as through a memory corruption vulnerability, not knowing the ABI means the attacker cannot feasibly call other functions in the applications or libraries it uses. The attacker would need to interactively determine the ABI for each function he needs, a task that is difficult in size-limited shellcodes. By carefully choosing ABI transformations, return-oriented-programming (ROP) attacks may be thwarted, as well.

In various examples, ABI modifications may relate to how functions are called and how function parameters and function return value settings are passed. For example, certain standards pass arguments to the stack in right-to-left order, store the stack pointer in a particular register, and return a value in a particular register, while the stack is cleaned up by the caller. Which registers are used and in what order parameters are place on the stack may, in many cases, be an arbitrary choice. By manipulating the arbitrary choices so that they are different from the standard and specific to a particular key (e.g., one of keys 7), the deployment of software written for a standard ABI or for a different key's ABI will produce aberrant behavior, while the deployment of instances 12 will execute properly. With conservative approaches on 32-bit systems, there are at least 48 different calling conventions created by modifying parameter order, saved stack pointer and return value registers, and register parameters. This can, in some cases, be expanded significantly by performing more aggressive modifications. The key space is much larger for 64-bit systems, since there are many more registers available.

In some examples, such as in the example shown in FIG. 2, LLVM may be augmented to automatically modify the ABI based on a key, such as one of keys 55. This approach may be similar in architecture to existing code-obfuscation or software security modules for LLVM, and this may result in little to no changes to the source code of software to be compiled, according to some examples.

Instances 12 that are deployed on a runtime system are not only randomized based upon the inputs provided to build environment 6 by configuration randomizer 4, but they are also capable, once deployed, to provide fabricated and/or false configuration information to potential attackers of the runtime system, based, in some examples, upon information provided by configuration randomizer 4 and/or plugins 20, which interface with plugin API 5 of configuration randomizer 4. The techniques described herein may utilize one or more host-level approaches to deceive attackers by providing such fabricated information. For example, upon deployment of instances 12 in a runtime system, the runtime system may use network proxies or Transmission Control Protocol (TCP)/Internet Protocol (IP) stack changes to thwart OS fingerprinting activities of a remote attacker. As another non-limiting example, the runtime system may provide stub network services from operating systems or configurations that are not actually in use. As further examples, the runtime system may fabricate system configuration information in protocols (e.g., Hypertext Transfer Protocol (HTTP)) that provide it, and/or fabricate user-agent strings in web browsers. Various other types of data fabrication or falsification may be achieved through implementation of the techniques described herein, as will be further described below.

In various examples, configuration randomizer 4 is configured to build scripts. Configuration randomizer 4 includes plugin API 5 for specifying how to alter a given application's configuration, or to select among alternative applications, in a functionality-preserving way. For instance, either nginx or Apache could be used to serve static web pages and the script would select one at random according to a key (e.g., one of keys 7). At a deeper level, in some non-limiting examples, the key could force patches in the operating system's TCP/IP stack, such as to its sequence number generation algorithm, which would confuse remote fingerprinting tools like nmap.

As part of this task, plugin API 5 of configuration randomizer 4 may be used in various ways to permute configurations or select among alternative applications. Generally, the use of plugin API 5 may, in various examples, involve patching source code, text files, or other configuration data. One or more plugins 20 may interface with plugin API 5 of configuration randomizer. Plugins 20 may be used for creating configuration information, such as, in some examples, false configuration information. For instance, as one non-limiting example, an individual plugin of plugins 20 may contain a source code patch for a nginx web server that causes it to report itself as Apache in its Server: headers. Other plugins of plugins 20 could enable or disable otherwise-unused functionality. Through the use of plugin API 5, system managers can create re-usable components for common items.

As previously indicated, FIG. 2 is a block diagram illustrating another example development computing system 50 that is configured to deploy randomized operating system kernel, application, and/or library instances, in accordance with one or more aspects of the present disclosure. As shown in FIG. 2, development computing system 50 includes configuration randomizer 52, plugins 70, keys 55, Intermediate Representation (IR) transformer 54, IR assembler 56, binary-to-IR disassembler 58, application and library binaries 60, and randomized instances 62. Randomized instances 62 may, upon generation, may be deployed on one or more runtime computing systems, such as runtime computing system 80 shown in FIG. 3 and/or runtime computing system 100 shown in FIG. 4.

Similar to randomized instances 12 shown in FIG. 1, randomized instances 62 shown in FIG. 2 may comprise one or more instances of software components, such as, for example, one or more instances of applications and/or operating systems/kernels. For instance, randomized instances 62 may include one or more operating system kernel instances 64, one or more application instances 66, and one or more library instances 68.

In cases where source code (e.g., application and library source code 8, operating system source code 10 shown in FIG. 1) is not accessible or otherwise available, the techniques of the present disclosure can utilize binary-to-IR disassembler 58 to generate, from application and library binaries 60, IR, such as LLVM IR. IR may, in various examples, comprise bitcode having a platform-independent binary format. Binary-to-IR disassembler 58 may configured to disassemble application and library binaries 60 and generate IR bitcode. IR transformer 54 then transforms the IR IR provided by binary-to-IR disassembler 58 based on one or more of keys 55 provided by configuration randomizer 52. In many examples, configuration randomizer 52 may function similarly to configuration randomizer 4 shown in FIG. 1. Plugins 70 may be similar to plugins 20 shown in FIG. 1, and plugin API 53 may be similar to plugin API 5. However, in the example of FIG. 2, IR transformer 54 is configured to utilize keys 55, which may be similar to keys 7 in FIG. 1, to perform binary transformations on the IR provided by binary-to-IR disassembler 58. IR transformer 54, in certain cases, may include code and/or one or more scripts.

The transformed IR provided by IR transformer 54 is then re-assembled by IR assembler 56 into executable form comprising randomized instances 62. Randomized instances 62 include one or more operating system kernel instances 64, one or more application instances 66, and one or more library instances 68. Each of randomized instances 62 may be deployed onto a runtime computing system.

Referring to both the examples of FIG. 1 and FIG. 2, in some examples, the techniques of the present disclosure use fine-grained address space layout randomization (ASLR), reordering source code segments at the function level (or smaller) throughout the executable address space of a library or an application, and also, in some cases, inserting non-executable memory pages between functions. This causes exploits based on particular code offsets (e.g., after discovering a library's base address), during execution of one or more of instances 12 (FIG. 1) and/or one or more of instances 62 (FIG. 2) on a runtime system, to immediately fault and crash. Similarly, using stack layout manipulation, the order and alignment of data on the stack is permuted and guard data may be inserted, which may cause stack-based memory corruption to have inconsistent behavior or outright fail. The compiler and/or linker of build environment 6, for example, can manipulate symbols, causing exploits that attempt to find a function or memory location (e.g., in a dynamically linked library (DLL)), using its symbol name, to fail during execution of one or more of instances on a runtime system. In addition, the library/function ABI may be altered by build environment 6 on a per-function basis instead of a program basis.

In certain examples, instances 12 (FIG. 1) generated by build environment 6 implement fine-grained address space layout randomization (ASLR). In these examples, configuration randomizer 4 and build environment 6 can generate one or more of instances 12 by inserting non-executable gaps in one or more of instances 12, which may force faults upon attempted execution. For example, one or more of instances 12 may include non-executable gaps in a loaded library as "guard pages" to force faults if any unauthorized code assumes standard library layouts. This thwarts common attacks to system-wide, coarse-grained ASLR where the attacker learns the address of a known function in a standard library, then computes the address of a desired function as an offset from the known location. Such offsets will be invalid in fine-grained ASLR and will result in execution faults. Most application and library code is amenable to such transformations by configuration randomizer 4 and build environment 6, already being compiled as position-independent code (PIC), as PIC is often required for dynamic linking.

In certain examples, the transformations may be implemented through one or more of LLVM or runtime dynamic linker changes for a runtime environment. In some cases, LLVM backend modules may be used, and, in some cases, modifications to runtime dynamic linkers may be implemented to make different ASLR layouts for each runtime invocation of a library. The LLVM-only technique makes different ASLR layouts for each instance of a library.

In various examples, two types of fine-grained library transformations may be utilized: stack layout manipulation and symbol manipulation. Stack layout manipulation helps detect and prevent stack-based attacks ("stack smashing") by reordering local variables on the stack and inserting space between them. If significant growth in the stack size is permissible, or there are relatively few local variables and the stack is small, build environment 6 can generate one or more of instances 12 that, upon execution, can insert un-writable pages of memory within the stack. Any attempts to "smash" the stack by overrunning a variable may trigger a hardware fault and crash instances upon attempted execution. To reduce potential run-time overhead associated with this technique, in some cases, stack layout manipulations can be restricted to only functions that handle user input or other untrusted data.

Symbol manipulation may be implemented to thwart an attacker's attempted use of certain standard library calls (e.g., dlopen( ) and dlsym( ) to load a library by hand and use functions within it. Build environment 6 may generate one or more instances of instances 12 that have instance-specific but internally consistent tables mapping original library function names to new names. Coupled with fine-grained ASLR, these names may be in a different order, which may prevent the attacker from using the index of a function within a library as a proxy for its name. These transformations can be applied at build (e.g., FIG. 1) or at transform time (e.g., FIG. 2). The net effect is that an application's call to a standard library function may cause, for example, the linker to actually look up another function instead. In the case where a standard library function is called with a string constant for the desired function name, the present techniques could detect this (e.g., at LLVM IR level, see FIG. 2) and make the appropriate mapping at build time.

Figure 3:
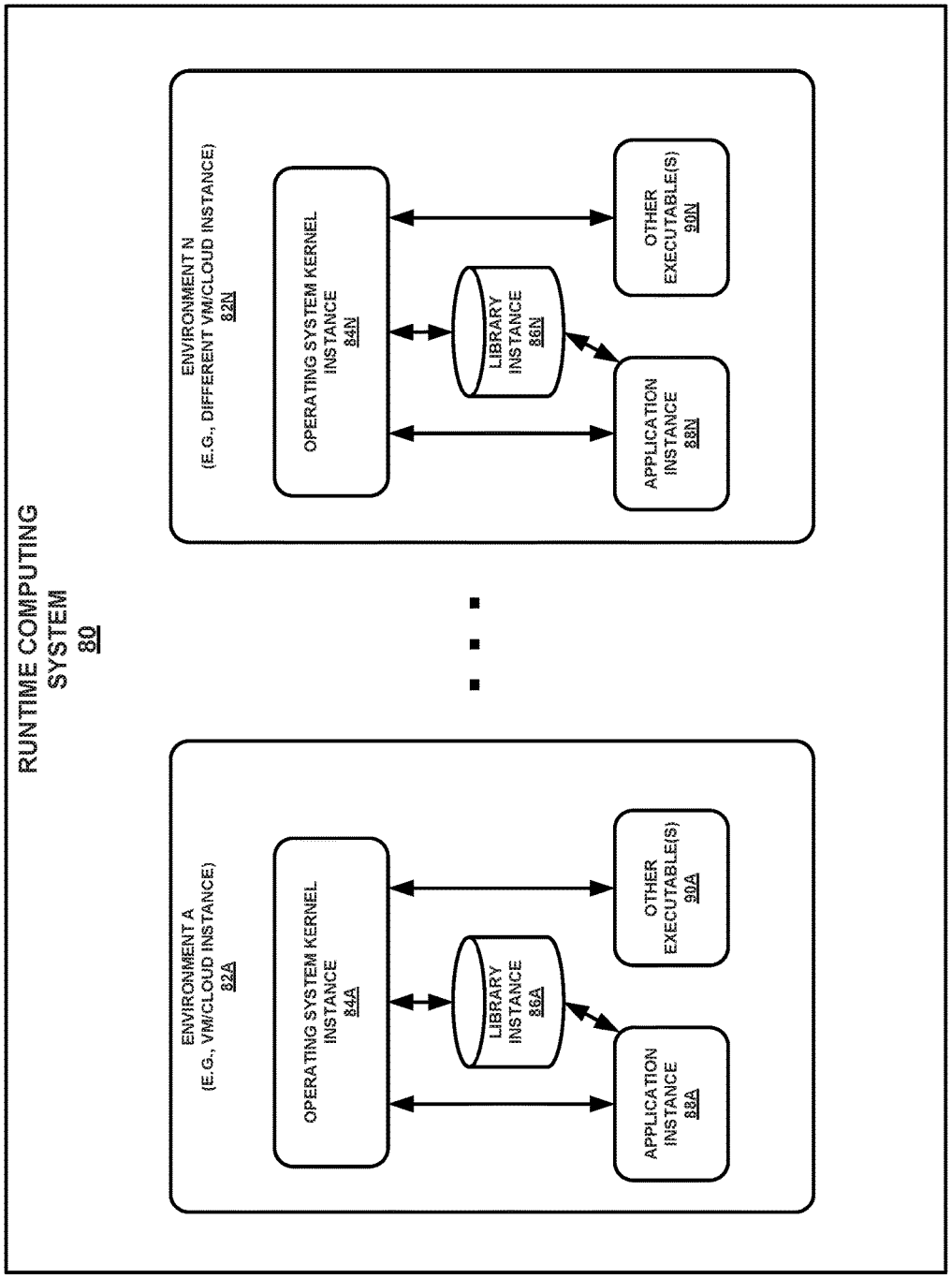
FIG. 3 is a block diagram illustrating an example runtime computing system that is configured to utilize randomized operating system kernel, application, and/or library instances, in accordance with one or more aspects of the present disclosure.

FIG. 3 is a block diagram illustrating an example runtime computing system 80 that is configured to utilize randomized operating system kernel, application, and/or library instances, in accordance with one or more aspects of the present disclosure. In various examples, randomized instances 12 (FIG. 1) and/or randomized instances 62 (FIG. 2) may be deployed for execution onto runtime computing system 80. As shown in FIG. 3, runtime computing system 80 may include one or more deployed environments 82A-82N (hereinafter, "environments 82"). Each of environments 82 may include one or more differently configured, randomized instances (e.g., one or more of instances 12, one or more of instances 62).

For example, as shown in FIG. 3, a first environment 82A ("ENVIRONMENT A") includes a first instance of a particular operating system kernel, namely instance 84A, as well as a first instance of a particular library, namely instance 86A. In addition, environment 82A includes a first instance of a particular application, namely instance 88A, as well as one or more other executables 90A. Application instance 88A interfaces with operating system kernel instance 84A and with library instance 86A, as indicated in FIG. 3, and application instance 88A may also communicate with one or more of executables 90A. Operating system kernel instance 84A interfaces with library instance 86A and executables 90A.

A second, distinct environment 82N ("ENVIRONMENT N") includes an nth instance of the particular operating system kernel, namely instance 84N, as well as an nth instance of the particular library, namely instance 86N. In addition, environment 82N includes an nth instance of the particular application, namely instance 88N, as well as one or more other executables 90N. Application instance 88N interfaces with operating system kernel instance 84N and with library instance 86N, as indicated in FIG. 3, and application instance 88N may also communicate with one or more of executables 90N. Operating system kernel instance 84N interfaces with library instance 86N and executables 90N.

Thus, as indicated in FIG. 3, within runtime computing system 80, any number of different environments 82 may be deployed, where each deployed environment executed a different, unique instance of a software component, such as an operating system kernel, library, and/or application. For example, application instances 88A and 88N in environments 82A and 82N, respectively, are different instances of the same software application that have been configured to have different operating characteristics during execution on runtime computing system 80. As a result, they are binary incompatible instances of the same software application. Similarly, as another example, operating system kernel instances 84A and 84N in environments 82A and 82N, respectively, are different instances of the same operating system/kernel that have been configured to have different operating characteristics during execution on runtime computing system 80. In various cases, as described previously, one or more of instances 84A-84N, 86A-86N, and/or 88A-88N in environments 82A-82N may be configured, during execution on runtime computing system 80, to output false information to an external computing system, such as an external system that is associated with a potential attacker.

In various examples, such as, for instance, those in runtime computing system 80 comprises a server system, these environments may be implemented via ephemeral virtual machines (VM's) that service individual requests from clients external to runtime computing system 80, such as described in U.S. patent application Ser. No. 14/165,368 entitled "FIGHT-THROUGH NODES FOR SURVIVABLE COMPUTER NETWORK", filed Jan. 27, 2014 (now U.S. Pat. No. 9,094,449 issued on Jul. 28, 2015), and U.S. patent application Ser. No. 14/791,089 entitled "FIGHT-THROUGH NODES WITH DISPOSABLE VIRTUAL MACHINES AND ROLLBACK OF PERSISTENT STATE", filed Jul. 2, 2015 (now United States Patent Application Publication No. 2015/0309831), each of which is incorporated herein by reference in its entirety. These VM's may, in various examples, comprise just-in-time, purpose-built VM's that can be checkpointed, rolled back, or automatically destroyed in the event of a suspected attack. New fleets of VM's for environments 82 can then rapidly instantiated to take their place, saving old snapshots for later forensic analysis. Through such implementation, each client may be serviced by a differently configured one of environments 82. Not only do any attack artifacts potentially disappear as soon as the client disconnects, but most of what the adversary learned about the configuration of an individual one of environments 82 may not apply the next time the adversary connects. A similar approach can be used for cloud services, where each of environments 82 comprises a cloud instance. Each client-facing cloud instance can be differently configured. Runtime computing system 80 may be resilient, enabling processes to operate despite attacks on runtime computing system 80 or impacts on other parts of the network.

In some examples, where runtime computing system 80 comprises a workstation, a workstation's image, associated with one of environments 82, may be replaced with a staged alternate image, associated with a different one of environments 82, every time the user logs off (e.g., at the end of the day). This may, in some instances, be efficient if the workstation uses an invisible hypervisor, such that the normal workstation operating system is simply a guest VM. This setup may also allow for network connection proxies to hide operating system identity. In this configuration, any user-specific persistent data may be saved to a shared, roaming profile or other centralized configuration management systems.

Figure 4:
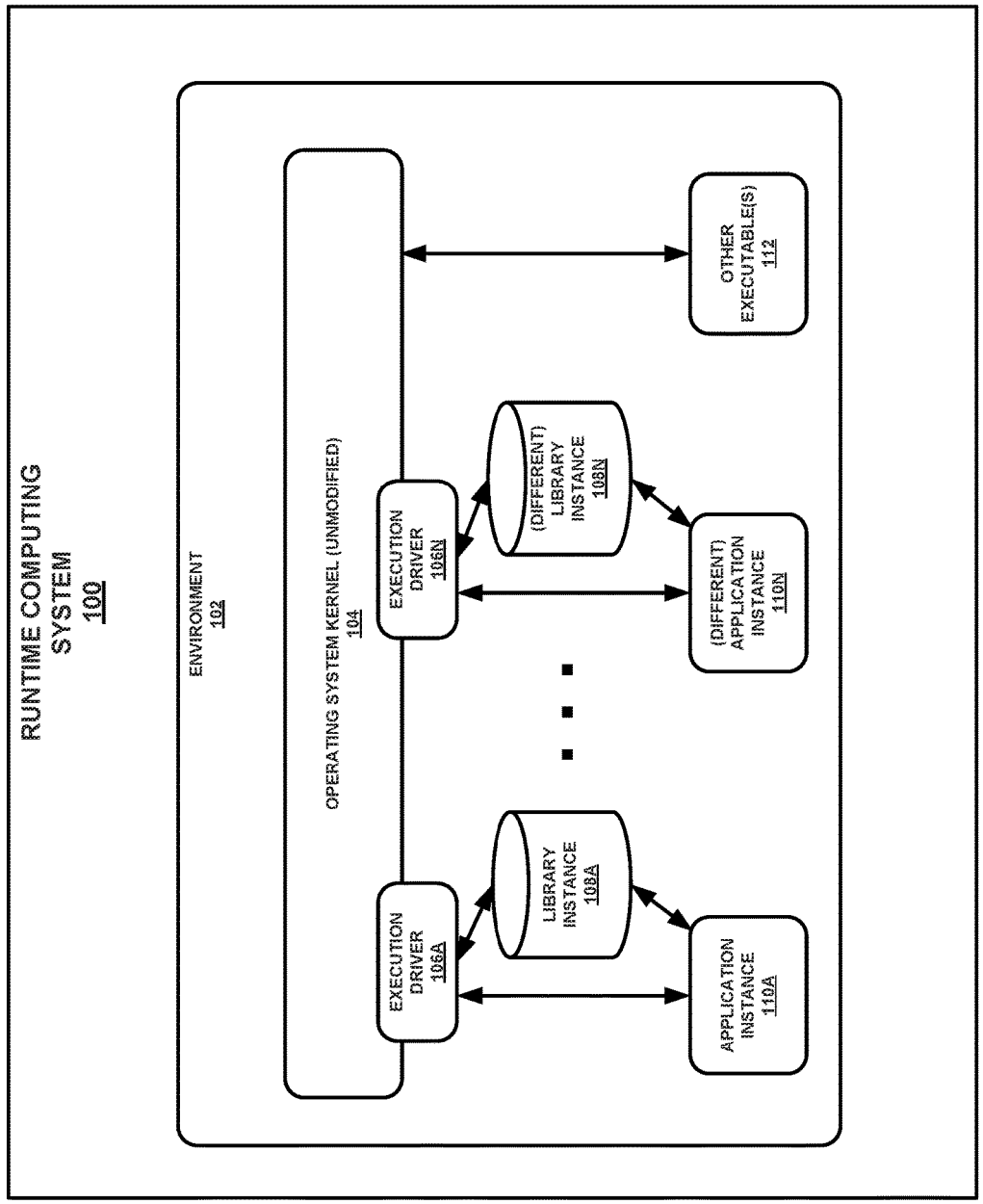
FIG. 4 is a block diagram illustrating another example runtime computing system that is configured to utilize randomized application and/or library instances, in accordance with one or more aspects of the present disclosure.

FIG. 4 is a block diagram illustrating another example runtime computing system 100 that is configured to utilize randomized application and/or library instances, in accordance with one or more aspects of the present disclosure. In various examples, randomized instances 12 (FIG. 1) and/or randomized instances 62 (FIG. 2) may be deployed for execution onto runtime computing system 100. Unlike the example of FIG. 3, in FIG. 4, runtime computing system 100 includes only one deployed environment 102, which provides an unmodified operating system kernel 104.

In the example of FIG. 4, one or more differently configured, randomized application instances 110A-110N for a given application are included in environment 102, and one or more differently configured, randomized library instances 108A-108N for a given library are also included in environment 102. Execution drivers 106A-106N allow these various instances to execute with a single operating system kernel 104. In some cases, execution drivers 106A-106N may be implemented using Linux Containers (LXC).

As indicated in FIG. 4, execution driver 106A interfaces with application instance 110A and library instance 108A, thereby allowing instances 108A and 110A to execute and interface with operating system kernel 104. Similarly, execution driver 106N interfaces with application instance 110N and library instance 108N, thereby allowing instances 108N and 110N to execute and interface with operating system kernel 104. One or more other executables 112 may also be included in environment 102.

FIGS. 3 and 4 illustrate different examples of runtime computing systems 80, 100 that may execute instances generated by a development computing system, such as one or more of instances 12 generated by development computing system 2, and/or one or more of instances 62 generated by development computing system 50. In certain examples, a runtime computing system may comprise the same computing system as a development computing system. In other examples, these may comprise different computing systems.

As described herein, techniques of the present disclosure may reduce an adversary's ability gain an accurate picture of a runtime computing environment by providing both falsely different and actually different system configurations that change over time. In various examples, these techniques may impose little-to-no performance or availability impact, given that the various transformations may be internally consistent. A plugin mechanism (e.g., plugin API 5 of FIG. 1, plugin API 53 of FIG. 2) may be implemented to automatically deploy falsified settings for different classes of software, and the techniques also randomize both an application's configurations and its inner workings, effectively minimizing or even preventing both high-level and low-level reconnaissance. In addition, the automated build systems and VM staging may free systems personnel from any burden related to creating random configurations.

By applying various different approaches, the techniques of the present disclosure modify operating system internals and the boundary between the application and the operating system using, for example, a key (e.g., one of keys 7 shown in FIG. 1 or one of keys 55 shown in FIG. 2). Instances generated with different keys may therefore be binary-incompatible with one another and with unmodified systems. The techniques may also modify operating system internal data structures and application binary interfaces on which reverse engineering tools and techniques rely. Each protected instance is uniquely scrambled, increasing the work factor for performing reverse engineering.

The techniques also modify kernel and library binary interfaces, making software exploits binary-incompatible with a protected instance and potentially causing them to fail, and also modify internal data structures and function-call mechanisms without necessarily adding additional security checks. Modified operating systems may be hardware-compatible with the original operating system, and while, in many examples, the techniques intentionally break binary compatibility with existing applications, they do not necessarily break source compatibility.

Figure 5:
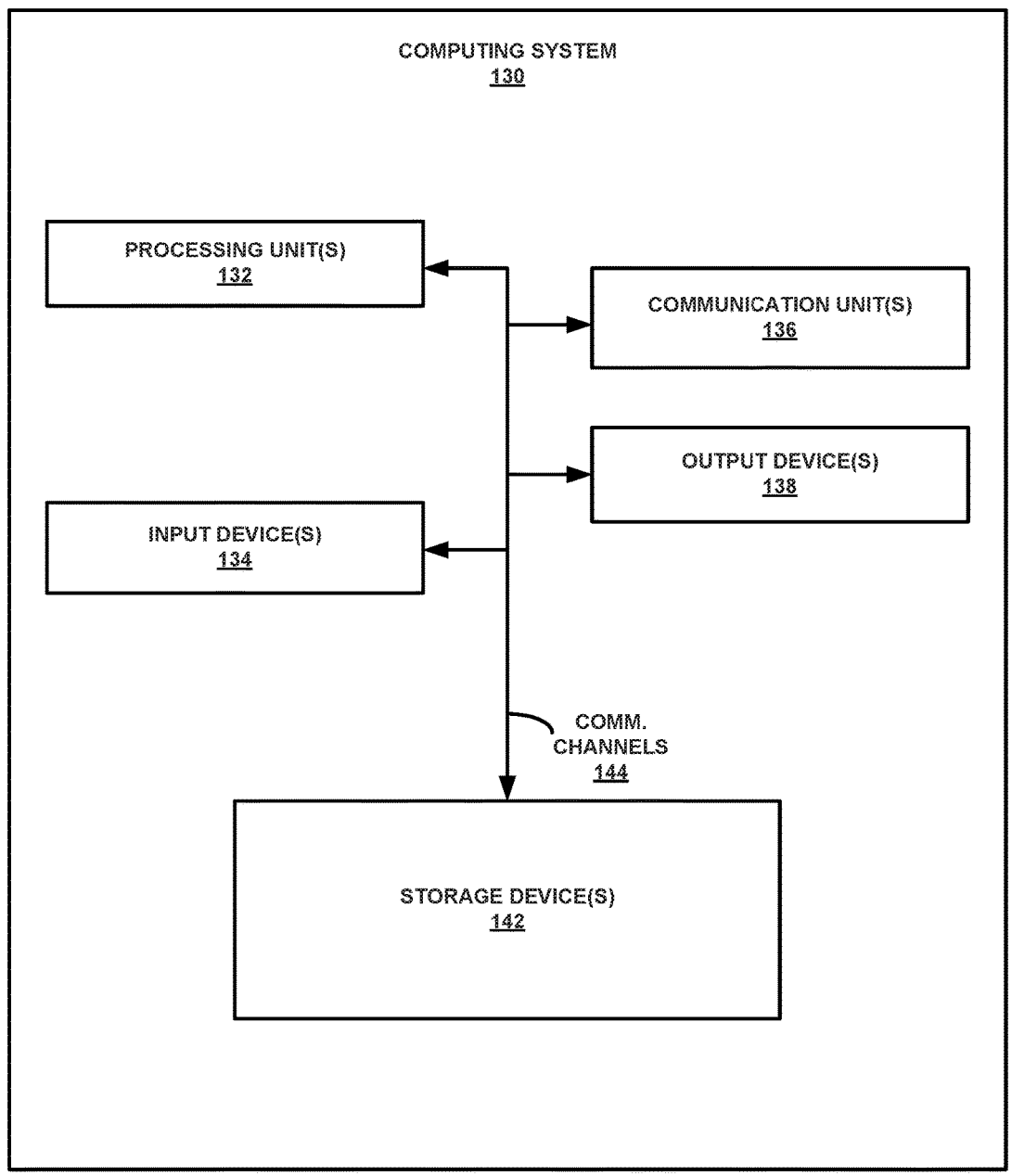
FIG. 5 is a block diagram illustrating further details of an example computing system, in accordance with one or more aspects of the present disclosure.

FIG. 5 is a block diagram illustrating further details of an example computing system 130, such as development computing system 2 shown in FIG. 1, development computing system 50 shown in FIG. 2, runtime computing system 80 shown in FIG. 3, and/or runtime computing system 100 shown in FIG. 4, in accordance with one or more aspects of the present disclosure. FIG. 5 illustrates only one particular example of computing system 130, and many other examples of computing system 130 may be used in other instances and may include a subset of the components shown, or may include additional components not shown, in FIG. 5.

As shown in the example of FIG. 5, computing system 130 includes one or more processing units 132, one or more input devices 134, one or more communication units 136, one or more output devices 138, and one or more storage devices 142. Communication channels 144 may interconnect each of the components 132, 134, 136, 138, and 142 for inter-component communications (physically, communicatively, and/or operatively). In some examples, communication channels 144 may include a system bus, a network connection, an inter-process communication data structure, or any other method for communicating data between hardware and/or software.

One or more input devices 134 of computing system 130 may receive input. Examples of input are tactile, audio, and video input. Examples of input devices 134 include a presence-sensitive screen, touch-sensitive screen, mouse, keyboard, voice responsive system, video camera, microphone or any other type of device for detecting input from a human or machine.

One or more output devices 138 of computing system 130 may generate output. Examples of output are tactile, audio, and video output. Examples of output devices 138 include a presence-sensitive screen, sound card, video graphics adapter card, speaker, cathode ray tube (CRT) monitor, liquid crystal display (LCD), or any other type of device for generating output to a human or machine. Output devices 138 may include display devices such as cathode ray tube (CRT) monitor, liquid crystal display (LCD), or any other type of device for generating tactile, audio, and/or visual output.

One or more communication units 136 of computing system 130 may communicate with one or more other computing systems or devices via one or more networks by transmitting and/or receiving network signals on the one or more networks. Examples of communication unit 136 include a network interface card (e.g. such as an Ethernet card), an optical transceiver, a radio frequency transceiver, or any other type of device that can send and/or receive information, such as through a wired or wireless network. Other examples of communication units 136 may include short wave radios, cellular data radios, wireless Ethernet network radios, as well as universal serial bus (USB) controllers. Communication units 136 may provide wired and/or wireless communication.

One or more storage devices 142 within computing system 130 may store information for processing during operation of computing system 130 (e.g., computing system 130 may store data accessed by one or more modules, processes, applications, or the like during execution at computing system 130). In some examples, storage devices 142 on computing system 130 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 142, in some examples, also include one or more computer-readable storage media. Storage devices 142 may be configured to store larger amounts of information than volatile memory. Storage devices 142 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 142 may store program instructions and/or data associated with one or more software/firmware elements or modules.

For example, when computing system 130 comprises an example of development computing device 2 shown in FIG. 1, storage devices 142 may store application and library source code 8, as well as operating system source code 10. In addition, storage devices 142 may store instructions and/or data associated with plugins 20, configuration randomizer 4, keys 7, build environment 6, and randomized instances 12.

As another example, when computing system 130 comprises an example of development computing device 50 shown in FIG. 2, storage devices 142 may store application and library binaries 60. In addition, storage devices 142 may store instructions and/or data associated with plugins 70, configuration randomizer 52, IR transformer 54, IR assembler 56, binary-to-IR disassembler 58, and randomized instances 62.

As another example, when computing system 130 comprises an example of runtime computing device 80 shown in FIG. 3, storage devices 142 may store instructions and/or data associated with environments 82. In yet another example, when computing system 130 comprises an example of runtime computing device 100 shown in FIG. 4, storage devices 142 may store instructions and/or data associated with environment 102.

Computing system 130 further includes one or more processing units 132 that may implement functionality and/or execute instructions within computing system 130. For example, processing units 132 may receive and execute instructions stored by storage devices 142 that execute the functionality of the elements and/or modules described herein. These instructions executed by processing units 132 may cause computing system 130 to store information within storage devices 142 during program execution. Processing units 132 may also execute instructions of the operating system to perform one or more operations described herein.

Figure 6:
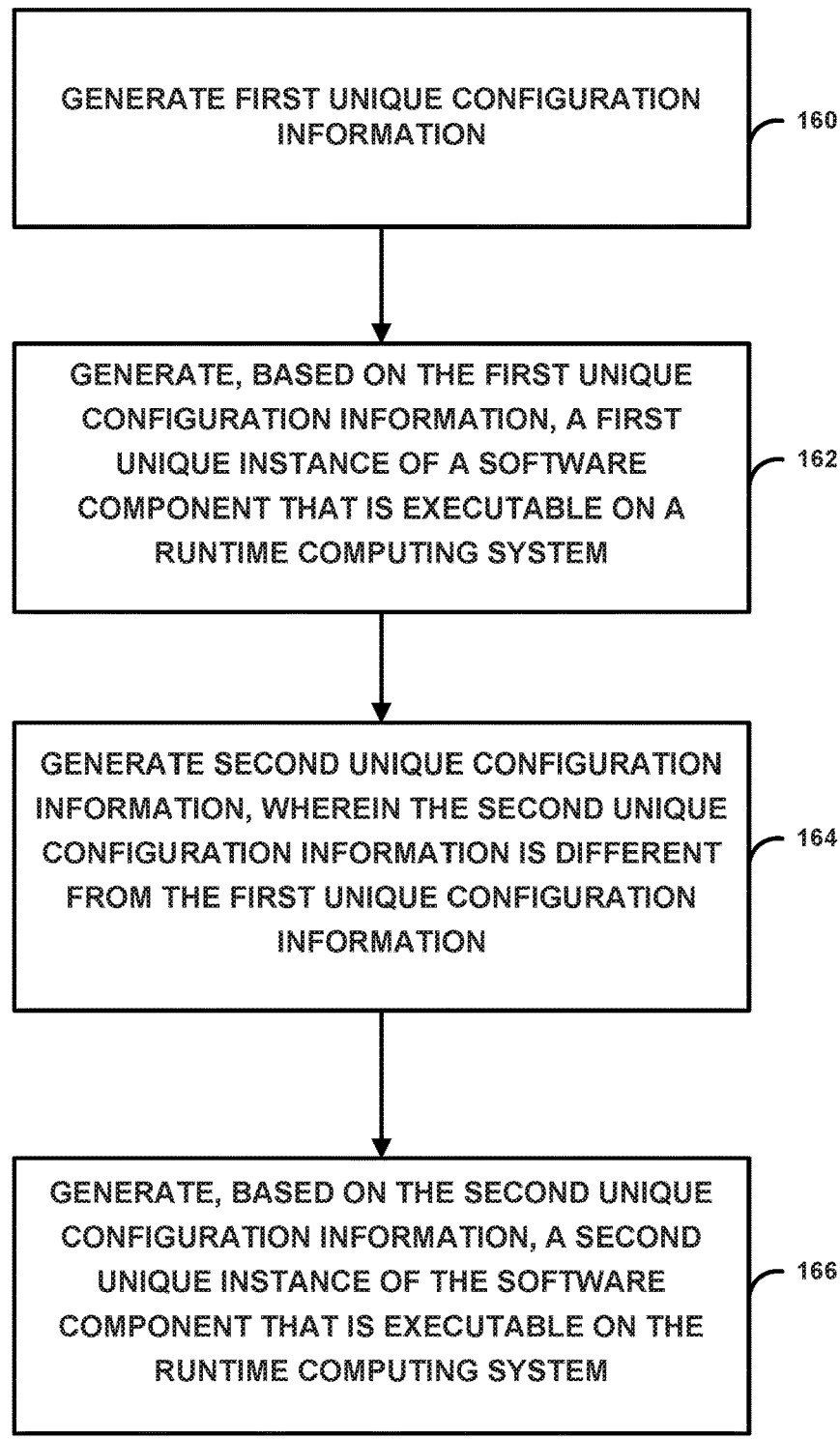
FIG. 6 is a flow diagram illustrating an example process that may be performed by a computing system, in accordance with one or more aspects of the present disclosure.

FIG. 6 is a flow diagram illustrating an example process that may be performed by a computing system, in accordance with one or more aspects of the present disclosure. For example, the process illustrated in FIG. 6, which may comprise one or more operations, may be performed by one or more of the development computing systems shown in FIGS. 1 and 2. For purposes of illustration only, it will be assumed that the process of FIG. 6 is performed by development computing system 2.

As illustrated in the example process of FIG. 6, development computing system 2 may provide (160) first randomized configuration information (e.g., a first one of keys 7, which may include first unique binary data). Development computing system 2 may generate (162), based on the first randomized configuration information, a first unique instance of a software component (e.g., a first one of operating system kernel instances 14, a first one or application instances 16) that is executable on a runtime computing system (e.g., runtime computing system 80). Development computing system 2 may provide (164) second randomized configuration information (e.g., a second one of keys 7, which may include second unique binary data), where the second randomized configuration information is different from the first randomized configuration information.

Development computing system 2 may then generate (166), based on the second randomized configuration information, a second unique instance of the software component (e.g., a second one of operating system kernel instances 14, a second one or application instances 16) that is executable on the runtime computing system. The first and second unique instances of the software component are different instances of the same software component that each are configured to have uniquely different operating characteristics during execution on the runtime computing system. The first and second unique instances of the software component are each further configured, during execution on the runtime computing system, to output false information to an external computing system.

In some examples, development computing system 2 may receive one or more configuration settings (e.g., via plugin API 5). Generating the first unique instance of the software component and/or the second unique instance of the software component may be further based on the one or more configuration settings. The first randomized configuration information and/or the second randomized configuration information may be based on the one or more configuration settings. In addition, the false information may also be based on the one or more configuration settings.

In some examples, generating the first unique instance of the software component includes using, by development computing system 2, the first randomized configuration information and source code (e.g., application and library source code 8, operating system source code 10) to generate the first unique instance of the software component. Generating the second unique instance of the software component includes using, by development computing system 2, the second randomized configuration information and the source code to generate the second unique instance of the software component, such that the first and second unique instances of the software component are each generated based on the source code (e.g., as shown in FIG. 1).

In some examples, the false information includes false configuration information associated with the runtime computing system. In some examples, generating the first unique instance of the software component includes creating, by development computing system 2, a first modification to an application binary interface (ABI) used by the first unique instance of the software component. Generating the second unique instance of the software component includes creating, by development computing system 2, a second modification to the ABI used by the second unique instance of the software component, wherein the first modification to the ABI is different than the second modification to the ABI.

For instances, in some cases, the first modification to the ABI may include a first modification to an operating system kernel ABI that is associated with a first reordering of a system call table, and the second modification to the ABI may include a second modification to the operating system kernel ABI that is associated with a second reordering of the system call table. In some cases, the first modification to the ABI may include a first modification to at least one of function calling conventions, function return value settings, or source code segment reordering used by the first unique instance of the software component, and the second modification to the ABI may include a second modification to the at least one of function calling conventions, function return value settings, or source code segment reordering used by the second unique instance of the software component.

In certain alternate examples, such as the example shown in FIG. 2, a development computing system, such as development computing system 50 shown in FIG. 2, may generate (e.g., using binary-to-IR disassembler 58) intermediate representation bitcode based on binary information that is associated with the software component (e.g., application and library binaries 60). Development computing system 50 may then generate the first unique instance of the software component (e.g., one of instances 62) using the first randomized configuration information and the intermediate representation bitcode to generate the first unique instance of the software component (e.g., using IR transformer 54 and IR assembler 56). Development computing system 50 may also generate the second unique instance of the software component by using the second randomized configuration information and the intermediate representation bitcode to generate the second unique instance of the software component, such that the first and second unique instances of the software component are each generated based on the intermediate representation bitcode.

Figure 7:
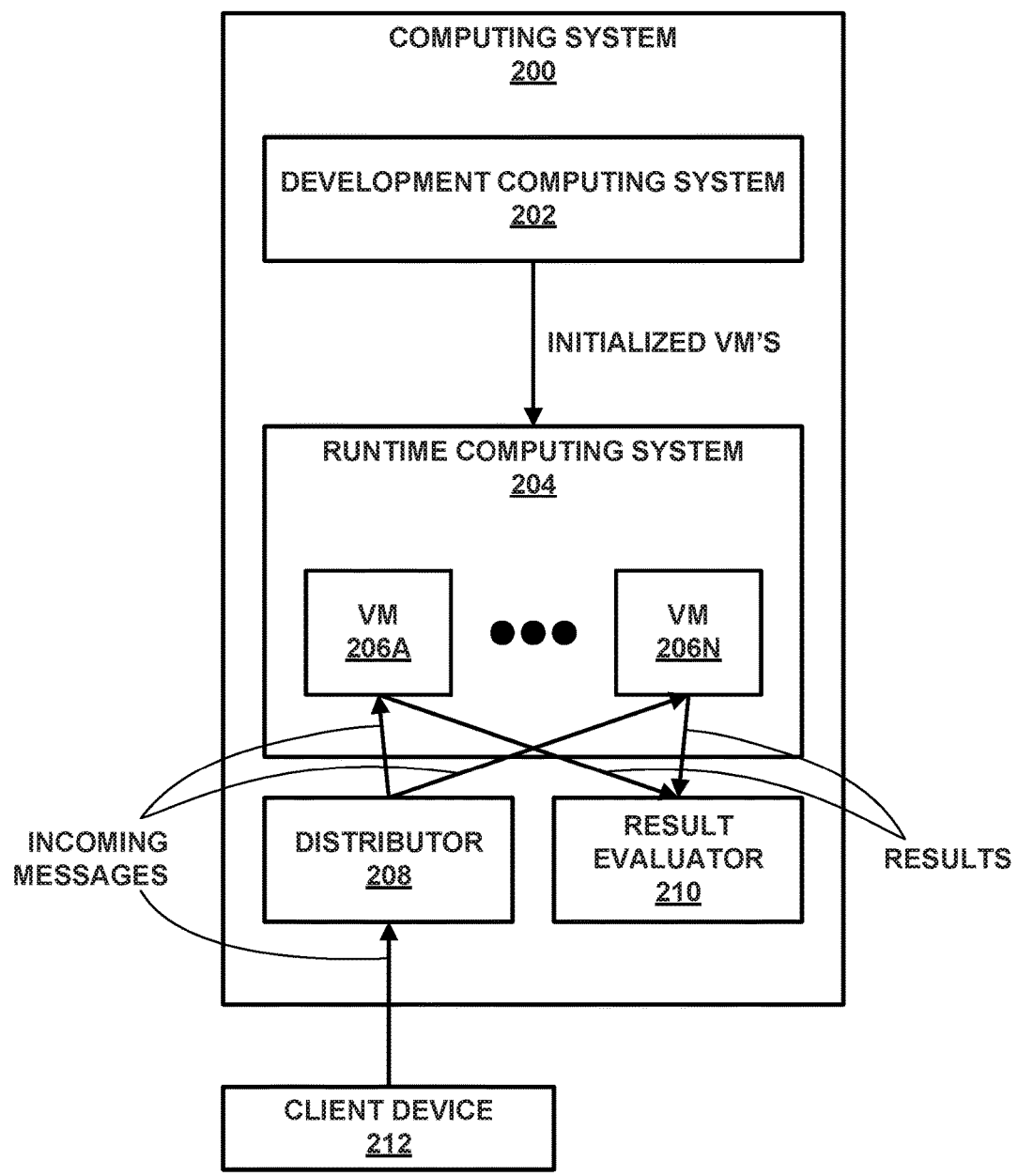
FIG. 7 is a block diagram illustrating an example computing system, in accordance with one or more aspects of this disclosure.

FIG. 7 is a block diagram illustrating an example computing system 200, in accordance with one or more aspects of this disclosure. As shown in the example of FIG. 7, computing system 200 is a computing system that comprises one or more computing systems. In the example of FIG. 7, computing system 200 comprises development computing system 202 and runtime computing system 204. Development computing system 202 may initialize a plurality of VMs. One or more of the VMs may include randomized operating system kernels, applications, and/or library instances. Development computing system 202 may be an instance of development computing system 2 (FIG. 1), development computing system 50 (FIG. 2), or another development computing system. After initializing a VM, computing system 200 may deploy the VMs on runtime computing system 204 (shown in the example of FIG. 7 as VM 206A through VM 206N (collectively, "VMs 206")). For instance, a hypervisor of runtime computing system 204 may start running the VM.

Development computing system 202 may initialize one or more of VMs 206 using the randomization techniques described elsewhere in this disclosure. For example, development computing system 202 may generate a randomized instance of an operating system for the particular VM. In this example, the randomized instance of the operating system for the particular VM has a randomized ABI. The randomized ABI may be an ABI modified in accordance with techniques described elsewhere in this disclosure. Furthermore, in this example, development computing system 202 may generate a randomized instance of a software program for the particular VM. The randomized instance of the software program may be configured to use the randomized ABI of the randomized instance of the operating system for the particular VM. In this example, development computing system 202 may install the randomized instance of the operating system for the particular VM and the randomized instance of the software program for the particular VM on the particular VM.

In the example of FIG. 7, computing system 200 further comprises a distributor 208 and a result evaluator 210. Distributor 208 may receive a series of incoming messages from a client device 212. Client device 212 may comprise a personal computer, mobile device, server computer, Internet of Things (IoT) device, or another type of computing device. The incoming messages may comprise messages conforming to various communication protocols, such as a Hypertext Transfer Protocol (HTTP), an Internet Protocol (IP), a File Transfer Protocol (FTP), a routing protocol, an application level protocol, and/or other types of communication protocols.

Distributor 208 may distribute a copy of each of the incoming messages to each of VMs 206. For instance, if distributor 208 receives a particular message from client device 212, distributor 208 may send a first copy of the particular message to VM 206A and a second copy of the particular message to VM 206N.

Result evaluator 210 may receive results generated by VMs 206 in response to the series of incoming messages. In various examples, the results may comprise various types of information. For example, the results may comprise response messages generated by the plurality of VMs for transmission to the client device. In this example, the response messages may conform to a communication protocol, such as a communication protocol to which the incoming messages conform. In some examples, the results may comprise error reports from VMs 206. The error reports may comprise various types of information. For example, an error report may comprise a crash report. In some examples, an error report comprises a report of an attempted use of a system call that is formatted in a manner inconsistent with an ABI of an operating system of a VM. In some examples, the error reports may comprise an event log. In some examples, the results may comprise VM configuration data from in-VM instrumentation (e.g., using tools for remote execution of application described in U.S. Patent Publication 2012/0209983, filed Feb. 10, 2011, and/or U.S. Patent Publication 2012/0210427, filed Feb. 10, 2011)) or through VM introspection. The VM configuration data may describe a configuration or state of the VM. For instance, the VM configuration data may specify the content of a Windows Registry or other database of low-level setting. Other examples of VM configuration data may include system-wide values such as FreeBSD sysctl values (which can be changed at runtime to customize kernel behavior), current firewall rules, particular ports are open, and so. Examples of VM configuration data may also include process-specific properties, such as active TCP connections, currently opened files, a list of all files that it has opened/modified, a current instruction pointer, a core dump (memory dump), a stack trace (list of function calls that led to this instruction), and so on.

Result evaluator 210 may compare the results generated by VMs 206. In response to determining that two or more of the results are not the same, result evaluator 210 may perform a cybersecurity defense action. If VMs 206 generate different results in response to the same series of incoming messages, it is likely that the series of incoming messages included a cyberattack that attempted to execute software that was not configured to use the correct ABI of the operating systems of VMs 206. For example, cyberattacks frequently depend on forcing machines to execute arbitrary attack code injected by the attacker. In this example, the arbitrary attack code may be configured to use the publicly available ABI of an operating system of one of VMs, but would not be aware of the randomized ABI of the operating system. Accordingly, an attempt to execute the arbitrary attack code may lead to the generation of a first set of results (e.g., indicating a software crash or an indication of the attempt) produced by one VM. However, in this example, if one of VMs 206 uses the publicly available ABI of the operating system, a second, different set of results would be produced based on the same series of incoming messages. In this way, computing system 200 may be able to detect and respond to cyberattacks.

Computing system 200 may comprise one or more processors, such as one or more digital signal processors (DSPs), general purpose microprocessors, application specific integrated circuits (ASICs), field programmable logic arrays (FPGAs), or other equivalent integrated or discrete logic circuitry. Development computing system 202, runtime computing system 204, distributor 208, and result evaluator 210 may be implemented using the same set of one or more processors in computing system 200 or different sets of processors in computing system 200. Thus, development computing system 202 may comprise a first set of one or more processors, runtime computing system 204 may comprise a second set of one or more processors, a distributor 208 may comprise a third set of one or more processors, and result evaluator 210 may comprise a fourth set of one or more processors. The first, second, third, and fourth sets of processors may be the same or different.

Figure 8:
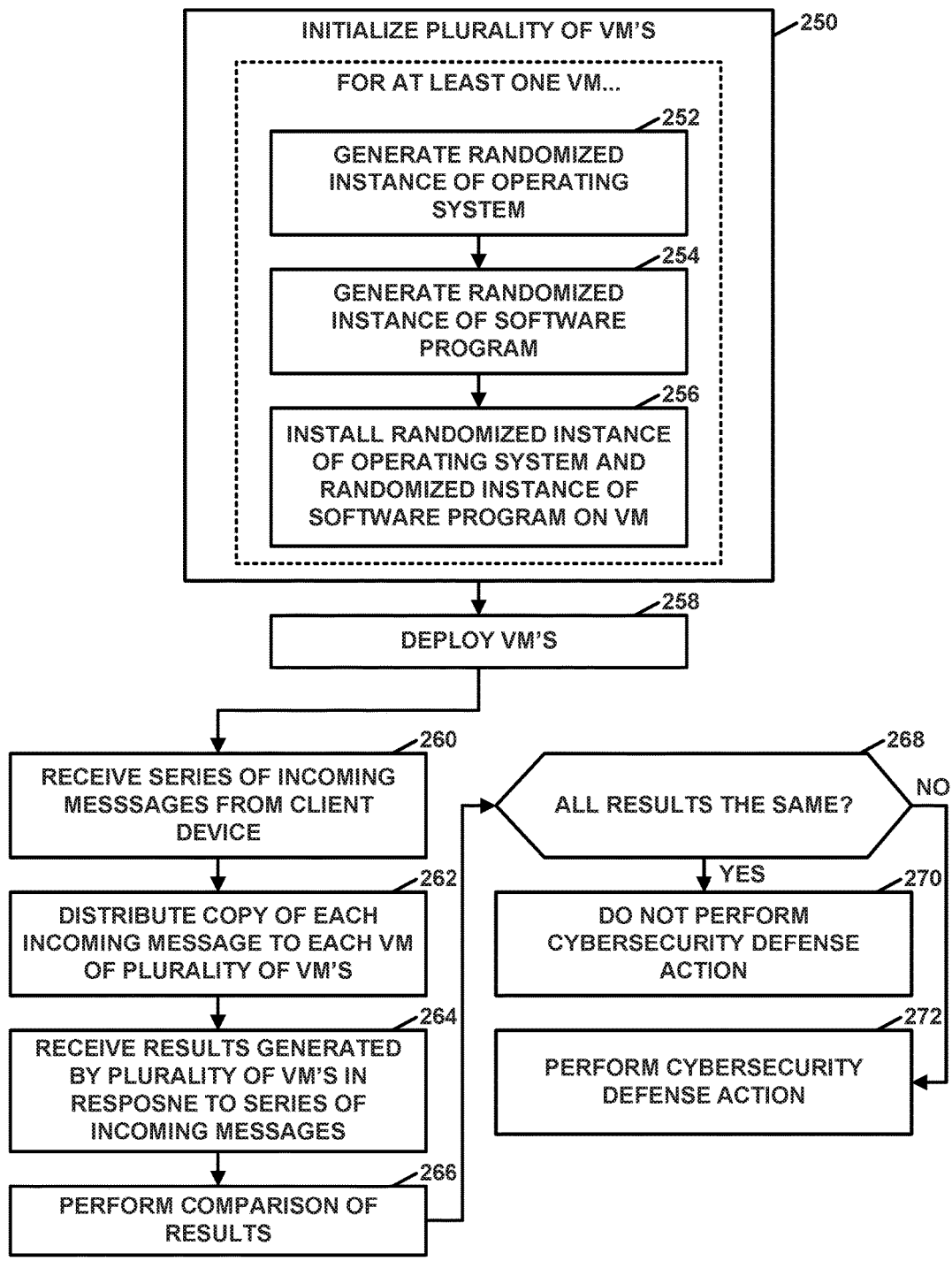
FIG. 8 is a flowchart illustrating an example operation, in accordance with one or more aspects of this disclosure.

FIG. 8 is a flowchart illustrating an example operation, in accordance with one or more aspects of this disclosure. The example operation of FIG. 8 is explained with respect to computing system 200 (FIG. 7). However, computing systems other than that of FIG. 7 may perform the example operation of FIG. 8.

In the example of FIG. 8, computing system 200 (e.g., development computing system 202 of computing system 200) may initialize a plurality of VMs (250). As part of initializing the plurality of VMs, computing system 200 may, for at least one particular VM of the plurality of VMs, generate a randomized instance of an operating system for the particular VM (252). In this example, the randomized instance of the operating system for the particular VM has a randomized ABI. The randomized instance of the operating system may comprise one of operating system kernel instances 14 (FIG. 1) or operating system kernel instance 68 (FIG. 2).

Furthermore, computing system 200 may generate a randomized instance of a software program for the particular VM (254). The software program may comprise a software application, a library, or another type of software program. For instance, the randomized instance of the software program may be one of application instances 16 (FIG. 1) or application instances 66 (FIG. 2). The randomized instance of the software program may be configured to use the randomized ABI of the randomized instance of the operating system for the particular VM. Computing system 200 may install the randomized instance of the operating system for the particular VM and the randomized instance of the software program for the particular VM on the particular VM (256). For instance, computing system 200 may generate a disk image of the particular VM in which the randomized instance of the operating system and the randomized instance of the software application are ready to run. Computing system 200 may deploy the plurality of VMs (258).

In some examples, computing system 200 may also initialize one or more of the VMs such that ABIs of the operating systems of the VMs are the same as publicly available ABIs of the operating systems of the VMs. For instance, if the particular VM mentioned above is a considered a first VM, an ABI of an operating system of a second VM of the plurality of VMs may be the same as a publicly available ABI of the operating system of the second VM. Furthermore, in some examples, multiple VMs of the plurality of VMs may have randomized ABIs. Thus, if the particular VM mentioned above is a considered a first VM and the ABI of the operating system of the first VM is considered a first randomized ABI, computing system 200 may, as part of initializing the plurality of VMs, generate a randomized instance of the operating system for a second VM of the plurality of VMs. In this example, the randomized instance of the operating system for the second VM has a second randomized ABI. Furthermore, in this example, computing system 200 may generate a randomized instance of the software program for the second VM. The randomized instance of the software program is configured to use the second randomized ABI. In this example, computing system 200 may install the randomized instance of the operating system for the second VM and the randomized instance of the software program for the second VM on the second VM. In this example, the first randomized ABI is different from the second randomized ABI, and neither the first randomized ABI nor the second randomized ABI are the same as a publicly available ABI of the operating system.

Furthermore, in the example of FIG. 8, computing system 200 may receive a series of incoming messages from a client device (260). Computing system 200 (e.g., distributor 208 of computing system 200) may distribute a copy of each incoming message in the series of incoming messages to each VM of the plurality of VMs (262). Additionally, computing system 200 may receive results generated by the plurality of VMs in response to the series of incoming messages (264). Computing system 200 may then perform a comparison on the results (266).

In response to the comparison revealing that all of the results are the same ("YES" branch of 268), computing system 200 does not perform a cybersecurity defense action. However, in response to the comparison revealing that two or more of the results are not the same ("NO" branch of 268), computing system 200 may perform a cybersecurity defense action (272). Computing system 200 may perform various cybersecurity defense actions. For example, computing system 200 may alert a human operator. In some examples, computing system 200 may continue running the software process to analyze whether and how a cyberattack is occurring. In some examples, computing system 200 may provide fake return data in response to the invocation of a system call to keep an attacker believing that the system call worked as intended. In some examples, development computing system 202 may perform actions (250)-(258), distributor 208 may perform actions (260)-(262), and result evaluator 210 may perform actions (264)-(272).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other data storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable data storage medium comprises a non-transitory medium. The term "non-transitory" indicates that the data storage medium is not embodied in a carrier wave or a propagated signal. In certain examples, a non-transitory data storage medium may store data that can, over time, change (e.g., in RAM or cache).

Various examples have been described. These and other examples are within the scope of the following claims.

What is claimed is:

1. A method comprising:
  initializing, by a computing system, a plurality of virtual machines (VMs), wherein initializing the plurality of VMs comprises:
    for at least one particular VM of the plurality of VMs:
      generating, by the computing system, a randomized instance of an operating system for the particular VM, wherein the randomized instance of the operating system for the particular VM has a randomized Application Binary Interface (ABI), the randomized ABI being a randomized version of an ABI of the operating system; and
      installing, by the computing system, the randomized instance of the operating system for the particular VM on the particular VM; and
  deploying, by the computing system, the plurality of VMs;
  receiving, by the computing system, a series of incoming messages from a client device;
  distributing, by the computing system, a copy of each incoming message in the series of incoming messages to each VM of the plurality of VMs;
  receiving, by the computing system, results generated by the plurality of VMs in response to the series of incoming messages, wherein the results generated by the VMs in response to the series of incoming messages include a first result different from a second result if code executing in one of the VMs uses the randomized version of the ABI and code executing in another one of the VMs uses a publicly available version of the ABI, the publicly available version of the ABI being different from the randomized version of the ABI;
  performing, by the computing system, a comparison on the results; and
  in response to the comparison revealing that two or more of the results are not the same, performing, by the computing system, a cybersecurity defense action.

2. The method of claim 1, wherein receiving the results comprises receiving, by the computing system, response messages generated by the plurality of VMs for transmission to the client device.

3. The method of claim 1, wherein receiving the results comprises receiving, by the computing system, error reports from the plurality of VMs.

4. The method of claim 1, wherein receiving the results comprises receiving, by the computing system, receiving VM configuration data.

5. The method of claim 1, wherein the particular VM is a first VM, and wherein an ABI of an operating system of a second VM of the plurality of VMs is the same as the publicly available ABI of the operating system of the second VM.

6. The method of claim 1, wherein the particular VM is a first VM, wherein the randomized ABI of the randomized instance of the operating system for the first VM is a first randomized ABI, and wherein initializing the plurality of VMs comprises:
  generating, by the computing system, a randomized instance of the operating system for a second VM of the plurality of VMs, wherein the randomized instance of the operating system for the second VM has a second randomized ABI; and
  installing, by the computing system, the randomized instance of the operating system for the second VM,
  wherein the first randomized ABI is different from the second randomized ABI, and neither the first randomized ABI nor the second randomized ABI are the same as the publicly available ABI of the operating system.

7. A computing system comprising:
  a development computing system comprising a first set of one or more processors;
  a runtime computing system comprising a second set of one or more processors;
  a distributor comprising a third set of one or more processors; and
  a result evaluator comprising a fourth set of one or more processors,
  wherein the development computing system is configured to:
    initialize a plurality of virtual machines (VMs), wherein the development computing system is configured such that, as part of initializing the plurality of VMs, the development computing system:
      for at least one particular VM of the plurality of VMs:
        generates a randomized instance of an operating system for the particular VM, wherein the randomized instance of the operating system for the particular VM has a randomized Application Binary Interface (ABI), the randomized ABI being a randomized version of an ABI of the operating system; and
        installs the randomized instance of the operating system for the particular VM on the particular VM; and
    deploy the plurality of VMs on the runtime computing system,
  wherein the distributor is configured to:
    receive a series of incoming messages from a client device; and
    distribute a copy of each incoming message in the series of incoming messages to each VM of the plurality of VMs, and
  wherein the result evaluator is configured to:
    receive results generated by the plurality of VMs in response to the series of incoming messages, wherein the results generated by the VMs in response to the series of incoming messages include a first result different from a second result if code executing in one of the VMs uses the randomized version of the ABI and code executing in another one of the VMs uses a publicly available version of the ABI, the publicly available version of the ABI being different from the randomized version of the ABI;

perform a comparison on the results; and in response to the comparison revealing that two or more of the results are not the same, perform a cybersecurity defense action.

8. The computing system of claim 7, wherein the results comprise response messages generated by the plurality of VMs for transmission to the client device.

9. The computing system of claim 7, wherein the results comprise error reports from the plurality of VMs.

10. The computing system of claim 7, wherein the results comprise VM configuration data.

11. The computing system of claim 7, wherein the particular VM is a first VM and an ABI of an operating system of a second VM of the plurality of VMs is the same as the publicly available ABI of the operating system of the second VM.

12. The computing system of claim 7, wherein the particular VM is a first VM, and the randomized ABI of the randomized instance of the operating system for the first VM is a first randomized ABI, and the development computing system is configured such that, as part of initializing the plurality of VMs, the development computing system:

generates a randomized instance of the operating system for a second VM of the plurality of VMs, wherein the randomized instance of the operating system for the second VM has a second randomized ABI; and installs the randomized instance of the operating system for the second VM on the second VM, wherein the first randomized ABI is different from the second randomized ABI, and neither the first randomized ABI nor the second randomized ABI are the same as the publicly available ABI of the operating system.

13. A non-transitory computer-readable storage medium having instructions stored thereon that, when executed, cause a computing system to:

initialize a plurality of virtual machines (VMs), wherein as part of causing the computing system to initialize the plurality of VMs, the instructions cause the computing system to:

for at least one particular VM of the plurality of VMs:

generate a randomized instance of an operating system for the particular VM, wherein the randomized instance of the operating system for the particular VM has a randomized Application Binary Interface (ABI), the randomized ABI being a randomized version of an ABI of the operating system; and install the randomized instance of the operating system for the particular VM on the particular VM; and deploy the plurality of VMs;

receive a series of incoming messages from a client device;

distribute a copy of each incoming message in the series of incoming messages to each VM of the plurality of VMs;

receive results generated by the plurality of VMs in response to the series of incoming messages, wherein the results generated by the VMs in response to the series of incoming messages include a first result different from a second result if code executing in one of the VMs uses the randomized version of the ABI and code executing in another one of the VMs uses a publicly available version of the ABI, the publicly available version of the ABI being different from the randomized version of the ABI;

perform a comparison on the results; and in response to the comparison revealing that two or more of the results are not the same, perform a cybersecurity defense action.

* * * * *

UNITED STATES PATENT AND TRADEMARK OFFICE
CERTIFICATE OF CORRECTION

Page 1 of 1

PATENT NO. : 10,200,401 B1
APPLICATION NO. : 15/604957
DATED : February 5, 2019
INVENTOR(S) : Judson Powers, Robert A. Joyce and Daniel McArdle It is certified that error appears in the above-identified patent and that said Letters Patent is hereby corrected as shown below:

In the Specification

Column 1, Line 12: Insert the following paragraph:
--STATEMENT REGARDING FEDERALLY SPONSORED RESEARCH OR DEVELOPMENT
This invention was made with government support under Contract No. FA8750-15-C-0269 and Contract No. FA8750-16-C-0304 awarded by the United States Air Force. The government has certain rights in this invention.--

Signed and Sealed this
Twenty-sixth Day of May, 2020

Andrei Iancu
*Director of the United States Patent and Trademark Office*